United States Patent [19]
Jain et al.

[11] Patent Number: 6,144,375
[45] Date of Patent: Nov. 7, 2000

[54] MULTI-PERSPECTIVE VIEWER FOR CONTENT-BASED INTERACTIVITY

[75] Inventors: Ramesh C. Jain; Terry Randolph Hicks; Asquith A. Bailey, all of San Diego; Ryan B. McKinley, Orinda; Don Yamato Kuramura; Arun L. Katkere, both of San Diego, all of Calif.

[73] Assignee: Praja Inc., San Diego, Calif.

[21] Appl. No.: 09/134,188

[22] Filed: Aug. 14, 1998

[51] Int. Cl.$^7$ .................................................... G06F 17/30
[52] U.S. Cl. ........................ 345/302; 345/355; 707/104
[58] Field of Search .................................. 707/530, 521, 707/5, 10, 102, 104; 345/302, 328, 334, 355

[56] References Cited

U.S. PATENT DOCUMENTS

| | | | |
|---|---|---|---|
| 5,109,425 | 4/1992 | Lawton | 382/1 |
| 5,170,440 | 12/1992 | Cox | 382/22 |
| 5,237,648 | 8/1993 | Mills et al. | 395/133 |
| 5,259,037 | 11/1993 | Plunk | 382/1 |
| 5,574,845 | 11/1996 | Benson et al. | 395/118 |

(List continued on next page.)

OTHER PUBLICATIONS

Yeung et al, "Video Visualization for Compact Presentation and Fast Browsing of Pictorial Content", IEEE Transactions on Circuits and Systems for Video Technology, bol. 7, No. 5, pp. 771–785, Oct. 1997.

Yeung et al, "Time–Constrained Clustering for Segmentation of VIdeo into Story Units", IEEE, Proceedings of the 13th International Conference on Image Processing, vol. 3, pp. 375–380, 1996.

Yeo et al, "Analysis and Synthesis for New Digital Video Applications", IEEE, Proceedings of 1997 International Conference on Image Processing, vol. 1, pp. 1–4, 1997.

Bolle et al, "Content–Based Digital Video Retrieval", IEE, International Broadcasting Convention, Conference Publication No. 447, pp. 160–165, 1997.

Arman et al., "Content–based Browsing of Video Sequences", Proceedings of the Second ACM International Conference on Multimedia, Oct. 1994, pp. 97–103.

Holzberg, Carol S., "Moving Pictures (Eighteen CD–ROM Video Stock Clips)", *CD–ROM World,* vol. 9, No. 6, p. 60(4).

Smoliar et al., "Content–Based Video Indexing and Retrieval", *IEEE Multimedia,* vol. 12, pp. 62–72, Summer 1994.

Yeo et al., "Rapid Scene Analysis on Compressed Video", *IEEE Transactions on Circuits and Systems for Video Technology,* vol. 5, No. 6, Dec. 1995.

Yeung et al., "Video Browsing Using Clustering and Scene Transitions on Compressed Sequences", *SPIE,* vol. 2417, pp. 399–413.

*Primary Examiner*—Joseph H. Feild
*Assistant Examiner*—Robert D. Bourque
*Attorney, Agent, or Firm*—Jaquez & Associates; Martin J. Jaquez, Esq.

[57] ABSTRACT

A method and apparatus for interactively viewing a real-world environment. The viewer includes a user interface having a first window for displaying a two-dimensional representation of a three-dimensional model of the real world environment. The viewer further includes a plurality of other viewing areas for displaying and querying for views of the real-world environment. The viewer includes a content-based event timeline that graphically depicts multi-media events satisfying user queries. Several methods can be used to select an event for display. For example, the user can select an event by selecting the event representation from the timeline. Alternatively, the user can select an event by querying the system for selected objects, viewing angles, input devices, etc. The viewer synchronizes and links together all of the multi-media data types associated with a selected event. Thus, when the user selects an event, the viewer displays all of the multi-media information (such as audio/video and textual information) that is associated with the selected event.

34 Claims, 7 Drawing Sheets

U.S. PATENT DOCUMENTS

| | | | |
|---|---|---|---|
| 5,708,767 | 1/1998 | Yeo et al. | 395/140 |
| 5,729,471 | 3/1998 | Jain et al. | 364/514 A |
| 5,752,244 | 5/1998 | Rose et al. | 797/5 |
| 5,805,806 | 9/1998 | McArthur | 395/200.8 |
| 5,818,935 | 10/1998 | Maa | 380/20 |
| 5,821,945 | 10/1998 | Yeo et al. | 345/440 |
| 5,832,499 | 11/1998 | Gustman | 707/103 |
| 5,884,056 | 3/1999 | Steele | 395/339 |
| 6,038,368 | 3/2000 | Boetje et al. | 366/52 |

MULTI-PERSPECTIVE VIEWER FOR CONTENT-BASED INTERACTIVITY

CROSS-REFERENCE TO RELATED APPLICATION

This invention is related to commonly assigned co-pending application Ser. No. 09/008,272, filed Jan. 16, 1998, entitled "3-D User Interface", hereby incorporated by reference herein.

BACKGROUND OF THE INVENTION

1. Field of the Invention

This invention relates to digital video imaging systems, and more particularly to a method and apparatus for dynamically interacting with and viewing content-based video images in a multi-perspective video imaging system.

2. Description of Related Art

The traditional model of television and video uses a single video stream that is transmitted to a passive viewer. Under this model, the passive viewer has no control over the objects or viewing perspectives from which to view the event of interest. Rather, a video editor or broadcast video producer dictates the composition of the video production viewed by the passive viewer. In contrast to the wide range of viewing perspectives and object selection available to a viewer when the viewer is actually present at an event of interest, the television or video viewer is constrained to view objects that are selected by the video producer. In addition, the television viewer must view the objects selected by the television producer from the viewing perspectives dictated by the producer.

In some cases, this is an acceptable arrangement, especially when a television or video viewer has little or no interest in the event and therefore has no preference regarding the perspectives or objects under view. However, there are several applications where greater viewer control over viewing perspectives and object selection is desirable. For example, when viewing a sporting event such as a basketball game, some viewers may wish to follow the flow of the game by viewing the control of the basketball, while others may wish to watch the play "away from the ball". Also, even though several viewers may wish to follow the ball, some may want to view the game from the visitors' side, others may want to view the game from the home players' side, and still others may want to view the play from above the basket. Similarly, when watching a political debate, some viewers may wish to view the speaker, while others may wish to view reactions of an opposing candidate or audience. Suffice it to say that the viewing perspectives and object selection will vary to the same extent that the personalities and viewing tastes of the various viewers vary.

Therefore, the need exists for providing a system and method for allowing viewers to selectively and dynamically view video information from a variety of viewing perspectives. In addition, a need exists for a system and method that allows a user/viewer to interface with a video database and select video information based upon the content of the video. That is, it is desirable to allow users/viewers of video information to interact with a video database system in such a way that they can select video data for viewing based upon some user (or system) specified criteria. It is therefore desirable to provide a system and method that permits viewers of video and television to select a particular viewing perspective from which perspective the video scene is henceforth presented. In addition, it is desirable to provide a method and apparatus that allows a viewer to alternatively select a particular object to be viewed (which may be a dynamically moving object) or an event in a real world scene that is of particular interest. As the scene develops its presentation to the viewer will prominently feature the selected object or the selected event. Accordingly, it is desirable to provide a multi-perspective viewer that provides "content-based" interactivity to a user/viewer. Such a viewer method and apparatus provides interactivity between the user/viewer and the scene to be viewed.

It is also desirable to provide a viewer method and apparatus that facilitates greater flexibility and interactivity between a viewer and recorded video information that also supports the playback and editing of the recorded video information. As noted above, in conventional video, viewers are substantially passive. All that viewers are allowed to do is to control the flow of video by pressing buttons such as play, pause, fast forward or reverse. These controls essentially provide the passive viewer only one choice for a particular segment of recorded video information: the viewer can either see the video (albeit at a controllable rate), or skip it. However, due to time and bandwidth restraints (especially when the video information is transmitted over a computer network such as the well-known Internet), it is desirable to provide the viewer improved and more flexible control over the video content to be viewed. For example, in a sports context, a particular viewer may only be interested in activities by a particular player, or in unusual or extraordinary plays (such as a fumble, three-point shot, goal, etc.). Such events are commonly referred to as "highlights".

By providing "content-based" interactivity to a video database, a viewer could query the system to view only those plays or events that satisfy a particular query. For example, a viewer could query such a system to view all of the home runs hit by a particular player during a particular time period. Thus, rather than sifting through (fast forwarding or reversing) a large portion of video information to find an event of interest, viewers could use a content-based video query system to find the events of interest. This not only saves the user/viewer time and energy, but it could also vastly reduce the amount of bandwidth that would be required when transmitting video information over a bandwidth constrained network. Rather than requiring the transmission of unnecessary video content, only the video events of interest are transmitted over the transmission network.

There are several prior art references that are related to the present multi-perspective viewer having content-based interactivity. For example, U.S. Pat. No. 5,109,425 to Lawton for a "Method And Apparatus For Predicting The Direction Of Movement In Machine Vision" concerns the detection of motion in and by a computer-simulated cortical network, particularly for the motion of a mobile rover. Although motion detection may be used to track objects under view and to build a video database for viewing by a user/viewer, the present invention is not limited to using the method taught by Lawton. Rather, several well-known motion detection methods can be used with the present invention without departing from the scope of the present claims. The video system adapted for use with the viewer of the present invention uses multiple two-dimensional video images from each of multiple stationary cameras as are assembled into a three-dimensional video image database. Once the multiple images of the video system are available for object, and for object tracking, it is relatively easy to detect motion in the video system.

Similarly, U.S. Pat. No. 5,170,440 to Cox for "Perceptual Grouping By Multiple Hypothesis Probabilistic Data Association" describes the use of a computer vision algorithm. However, in contrast to the system taught by Cox, the video system adapted for use with the present viewer invention avails itself of much more a priori information than the single-point machine vision system taught by Cox. More specifically, the video system used with the present viewer uses multiple two-dimensional video images from multiple stationary cameras. These multiple two-dimensional images are assembled into a three-dimensional video image database.

Other prior art that are related to the present invention include prior art related to the coordinate transformation of video image data. For example, U.S. Pat. No. 5,259,037 to Plunk for "Automated Video Imagery Database Generation Using Photogrammetry" discusses the conversion of forward-looking video or motion picture imagery into a database particularly to support image generation of a "top down" view. The present invention does not require a method as sophisticated as that taught by Plunk. In general, the necessary image transformations of the present invention are not plagued by dynamic considerations (other than camera pan and zoom). U.S. Pat. No. 5,237,648 to Cohen for an "Apparatus And Method For Editing A Video Recording By Selecting And Displaying Video Clips" shows and discusses some of the concerns, and desired displays, presented to a human video editor. These concerns are addressed by the present multi-perspective viewer having content-based interactivity.

Arguably, the closest prior art reference to the present invention is U.S. Pat. No. 5,729,471 to Jain et al. for "Machine Dynamic Selection of one Video Camera/Image of a Scene from Multiple Video Cameras/Images of the Scene in Accordance with a Particular Perspective on the Scene, an Object in the Scene, or an Event in the Scene", hereby incorporated by reference herein, hereinafter referred to as the '471 patent. The '471 patent teaches a Multiple Perspective Interactive (MPI) video system that provides a video viewer improved control over the viewing of video information. Using the MPI video system, video images of a scene are selected in response to a viewer-selected (i) spatial perspective on the scene, (ii) static or dynamic object appearing in the scene, or (iii) event depicted in the scene. In accordance with the MPI system taught by Jain in the '471 patent, multiple video cameras, each at a different spatial location, produce multiple two-dimensional video images of the real-world scene, each at a different spatial perspective. Objects of interest in the scene are identified and classified by computer in these two-dimensional images. The two-dimensional images of the scene, and accompanying information, are then combined in a computer into a three-dimensional video database, or model, of the scene. The computer also receives user/viewer-specified criterion relative to which criterion the user/viewer wishes to view the scene.

From the (i) model and (ii) the criterion, the computer produces a particular two-dimensional image of the scene that is in "best" accordance with the user/viewer-specified criterion. This particular two-dimensional image of the scene is then displayed on a video display to be viewed by the user. From its knowledge of the scene and of the objects and the events therein, the computer may also answer user/viewer-posed questions regarding the scene and its objects and events.

The present invention uses systems and sub-systems that are similar in concept to those taught by the '471 patent. For example, the present viewer interacts with a multi-perspective video system and video database that is similar in concept to that taught in the '471 patent. However, the content of the video database contemplated for use with the present viewer invention is much more extensive than that of the '471 patent. Also, the present invention is adapted for use with an inventive "capturing" sub-system that automatically creates a content-based and annotated database that can be accessed by the present viewer. In addition, the present inventive multi-perspective viewer is more interactive and has much greater flexibility than the user interface taught or suggested by the '471 patent.

The system taught by the '471 patent suggests a user interface that allows a viewer/user to specify a specific perspective from which to view a scene. In addition, the user can specify that he or she wishes to view or track a particular object or person in a scene. Also, the user can request that the system display a particularly interesting video event (such as a fumble or interception when the video content being viewed is an American football game). Significantly, the user interface taught by the '471 patent contemplates interaction with a video database that uses a structure that is developed prior to the occurrence of the video event. The video database structure is static and uses a priori knowledge of the location and environment in which the video event occurs. The video database remains static throughout the video program and consequently limits the flexibility and adaptability of the viewer/user interface.

In contrast, the video database developed for use with the present invention is much more dynamic. The database is automatically constructed using multiple multi-media data types. The structure of the database is defined initially based upon a priori information about the location or video program. However, the database structure is dynamically built by parsing through the structure and updating the database as the multi-media program progresses. Because the database created for use with the present viewer invention is derived from the specific multi-media program under view, and because it uses multiple multi-media data types, the database is much richer and therefore offers much more flexible and interesting viewing opportunities. No such database is taught or suggested by the '471 patent. Rather, the '471 patent teaches a database based upon "live" video streams obtained from a plurality of cameras offering a plurality of viewing perspectives of a program. Although the '471 patent teaches an interesting multi-perspective system that is interfaced by a rudimentary user interface, it does not contemplate synchronizing multiple multi-media data types (i.e., video, audio, data and other information).

Accordingly, a need exits for an integrated multi-perspective viewing method and apparatus having content-based interactivity with a user/viewer. Such a multi-perspective viewer should allow a user/viewer to easily and flexibly interact with a fully linked video, audio, and data database in an intuitive and straightforward manner. The viewer should be capable of use either directly (that is, in direct communication with) a multiple perspective interactive multi-media system, or remotely via the worldwide web or some other communications network. The present invention provides such an integrated multi-perspective viewing method and apparatus.

SUMMARY OF THE INVENTION

The present invention is a novel method and apparatus for interactively viewing multi-media events recorded and maintained by an interactive multi-media system. The viewing method and apparatus includes a powerful, intuitive, yet highly flexible means for accessing the multi-media system.

The present viewer facilitates multi-perspective interactive viewing of linked multi-media events. In one preferred embodiment, the viewer includes an event timeline that provides a graphical representation of the events satisfying user queries. The user can access an event simply by selecting the representation of the event on the timeline. In addition, because the events are linked to other information displayed to the user, alternative means for selecting an event are provided by the viewer. For example, the user can select an event by interacting with a 2D model window or video window. Because the system links together all of the multi-media data types associated with a selected event, the viewer synchronizes and displays the multiple media when a user selects the event. User perspectives can be based upon varying criteria such as viewing perspectives, objects, and events. Complex queries can be made using the present viewer. For example, the user can specify particular objects satisfying selected event criteria. The events satisfying the complex queries are represented and displayed on the timeline. Alternate best views are provided or suggested by the present viewer. The viewer also provides context-sensitive VCR controls that facilitate content-based forwarding/reversing of event displays.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The preferred embodiment of the present invention is a method and apparatus for providing interactivity between a "multi-perspective video" system and a user/viewer of the system. As described in more detail hereinbelow, the multi-perspective video system preferably has a multi-media database constructed from a plurality of multiple multi-media data types. More specifically, the database is preferably constructed automatically during a capturing/filtering stage of operation. The capture/filter stage creates a multi-media database based upon certain filtering constraints that are provided by a system operator during a pre-processing stage.

For instance, if the multi-media program is an American football game, the constraints placed on the raw ("live") multi-media program may be "scoring plays" such as touchdowns, field goals, etc., "erroneous plays" such as interceptions and fumbles, other user-defined plays and key players. Once the constraints are created, the capture/filter stage filters out the raw multi-media data and creates a multi-media database containing only those multi-media events that satisfy the constraints. The capture stage annotates and synchronizes the filtered video data with other data types such as audio, data (e.g., statistical information), and other media types to create the database that is accessed by the present inventive viewing method and apparatus.

Overviews of exemplary multiple perspective interactive multi-media systems adapted for use with the present multi-perspective viewer are provided below. However, those skilled in the computer user interface art will realize that the present viewer can be adapted for use with any system that provides context-sensitive video, audio, and data information.

Figure 1:
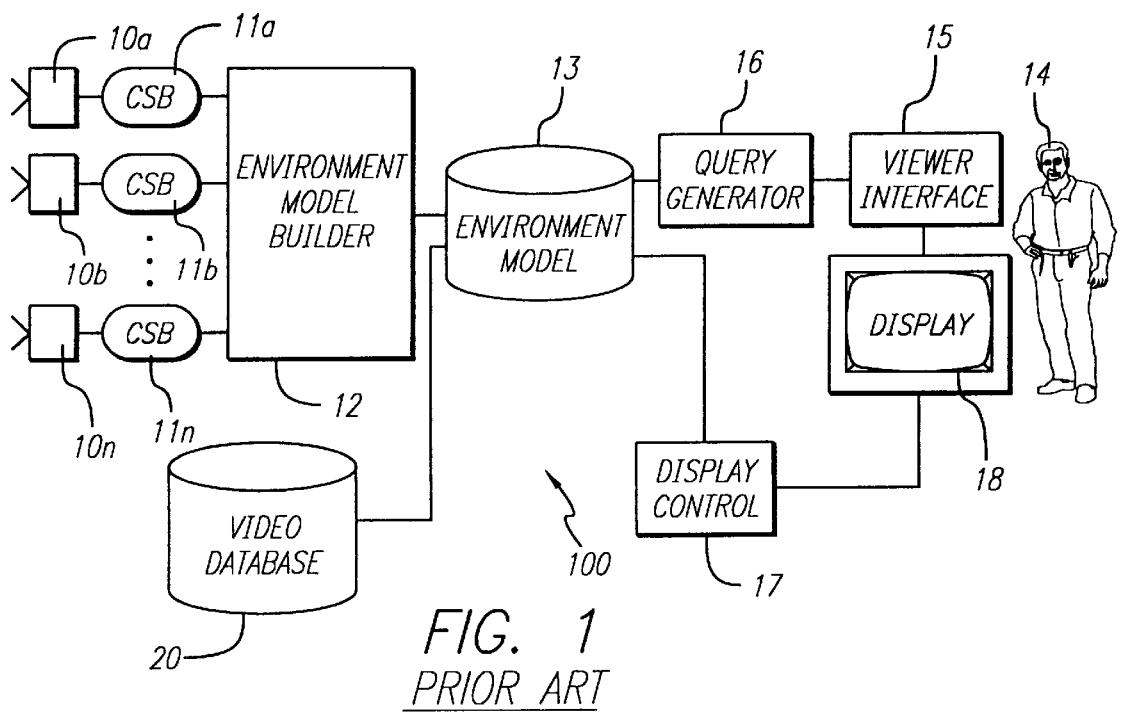
FIG. 1 shows a block diagram of a prior art multiple perspective interactive (MPI) video system.

Overview of Multiple-perspective Interactive Multimedia Systems for Use with the Present Viewer Invention The Multiple Perspective Interactive (MPI) Video System of the '471 Patent As described above, one exemplary multi-perspective video system that might possibly be adapted for use with the present inventive multi-perspective viewer is described in the '471 patent. FIG. 1 shows a block diagram of the multiple perspective interactive (MPI) video system set forth in the '471 patent. As described in the '471 patent, the prior art MPI video system 100 comprises a plurality of cameras 10 (e.g., 10a, 10b, through 10n), a plurality of camera scene buffers (CSB) 11 associated with each camera (e.g., CSB 11a is associated with camera 10a), an environment model builder 12, an environment model 13, a video database 20, a query generator 16, a display control 17, a viewer interface 15 and a display 18. As described in the '471 patent each camera 10a, 10b, . . . 10n image objects from different viewing perspectives. The images are converted into associated camera scenes by the CSBs 11. As described in much more detail in the '471 patent, multiple camera scenes are assimilated into the environment model 13 by a computer process in the environment model builder 12. A user/viewer 14 selects a perspective from which to view an image under view using the viewer interface 15. The perspective selected by the user/viewer is communicated to the environment model 13 via a computer process in the query generator 16. The environment model 13 determines what image to send to the display 16 via the display control 17.

Figure 2:
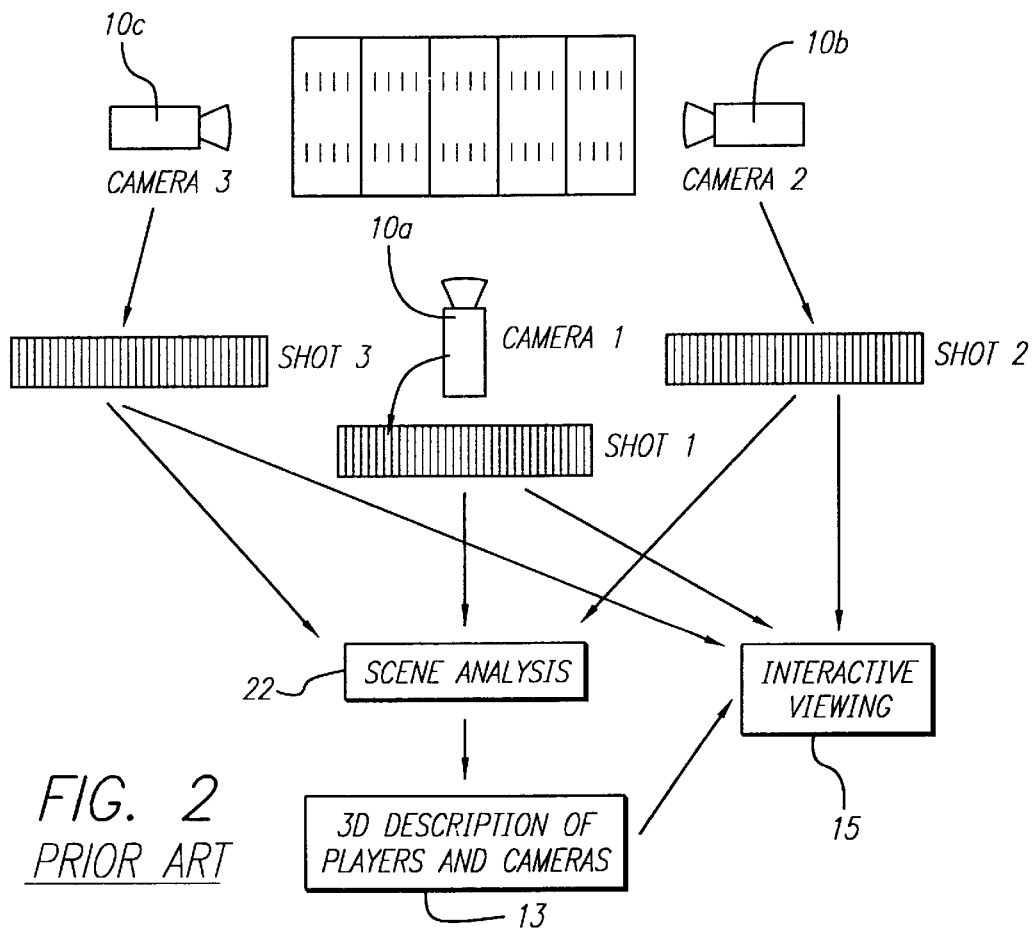
FIG. 2 is a functional block diagram of the MPI video system of FIG. 1 used in an interactive football video application.

One particular application of an MPI television system is shown in FIG. 2. As shown in FIG. 2, an American football game is captured by a plurality of cameras 10 (10a, 10b, and 10c) and subsequently analyzed by a scene analysis subsystem 22. The information obtained from the individual cameras 10a, 10b, and 10c is used to form an environment model 13 (which is a three-dimensional description of the players and cameras). The environment model 13 communicates with an interactive viewing block 15 to allow a user/viewer to interactively view the football game imaged by the plurality of cameras 10.

As described in the '471 patent the preferred architecture of an MPI video system depends upon the specific application that uses the system. However, the MPI system must include at least the following seven sub-systems and processes that address certain minimal functions. First, a camera scene builder is required by any MPI video system. In order to convert an image sequence of a camera to a scene sequence, the MPI video system must have an understanding of where the camera is located, its orientation, and its lens parameters. Using this information, the MPI video system is then able to locate objects of potential interest, and the locations of these objects in the scene. For structured applications, the MPI video system may use some knowledge of the domain, and may even change or label objects to make its task easier. Second, as shown in FIG. 1, an environment model builder is required. Individual camera scenes are combined in the MPI video system 100 to form a model of the environment. All potential objects of interest and their locations are recorded in the environment model. The representation of the environment model depends on the facilities provided to the viewer. If the images are segmented properly, then, by using known computing methods, it is possible to build environment models in real-time (i.e., video refresh rates), or in something approaching real-time.

Third, a viewer interface permits the viewer to select the perspective that a user/viewer desires. This information is obtained from the user/viewer in a directed manner. Adequate tools are provided to the user/viewer to point and to pick objects of interest, to select the desired perspective, and to specify events of interest. Fourth, a display controller is required to respond to the user/viewer's requests by selecting appropriate images to be displayed to each such viewer. These images may all come from one perspective, or the MPI video system may have to select the best camera at every point in time in order to display the selected view and perspective. Accordingly, multiple cameras may be used to display a sequence over time, but at any given time only a single best camera is used. This requires the capability of solving a "camera hand-off" problem.

Fifth, a video database must be maintained by the MPI system. If a video program is not in real-time (i.e., a television program) then it is possible to store an entire program in a video database. Each camera sequence is stored along with its metadata. Some of the metadata is feature based, and permits content-based operations. See, for example, Ramesh Jain and Arun Hampapur; "Metadata for video-databases" appearing in SIGMOD Records, December 1994.

In many applications of the MPI video system, environment models are also stored in the database to allow rapid interactions with the system. Sixth, real-time processing of video must be implemented to permit viewing of real-time video programs such as television programs. In this case a special system architecture is required to interpret each camera sequence in real-time and to assimilate their results in real-time so that, based on a user/viewer input, the MPI video system 100 can use the environment model to solve the camera selection problem. A practitioner of the computer arts and sciences will recognize that this sixth requirement is nothing but the fifth requirement performed faster, and in real-time. The requirement might just be realizable in software if computational parallelism is exploited, but, depending upon simplifying assumptions made, a computer ranging from an engineering work station to a full-blown supercomputer may be required. Fortunately, low-cost (but powerful) microprocessors may be distributed to each of the Camera Sequence Buffers CSB 11a, 11b, . . . 11n in order to isolate, and to report, features and dynamic features within each camera scene. Correlation of scene features at a higher process level may thus be reduced to a tractable problem.

Another approach to satisfying this requirement is to simplify the problem by demanding that the scene, and each camera view thereof, include constant, and readily identifiable, markers as a sort of video "grid". An American football field already has a grid in the form of yard lines and hash marks. So might a college courtyard having benches and trees.

Seventh, and last, a visualizer is required for those applications requiring the display of a synthetic image to satisfy a user/viewer's request. For example, it is possible that a user/viewer will select a perspective that is not available from any of the plurality of cameras 10. A trivial solution is simply to select the closest camera, and to use its image. Another solution is to select the best, but not necessarily the closest, camera and to use its image and sequence.

As described above in the background to the invention, the content of the video database contemplated for use with the present inventive viewer is much more extensive than that contemplated by the '471 patent. The system used with the present invention has a capture/filter process that automatically creates multiple multi-media data types that are interacted with by the present viewer invention. While the system taught by the '471 patent suggests a user interface that allows a viewer/user to specify viewing a program from a specific perspective, the user interface taught by the '471 patent is somewhat limited. For example, the user interface of the '471 patent does not facilitate the synchronization and subsequent complex querying of multiple multi-media data types as taught by the present invention. Therefore, although the '471 patent teaches many of the general concepts used by an interactive system that can be adapted for use with the present inventive viewer, a preferred multi-media system (referred to below as the "Presence System") for use with the present invention is described below with reference to FIG. 3.

Figure 3:
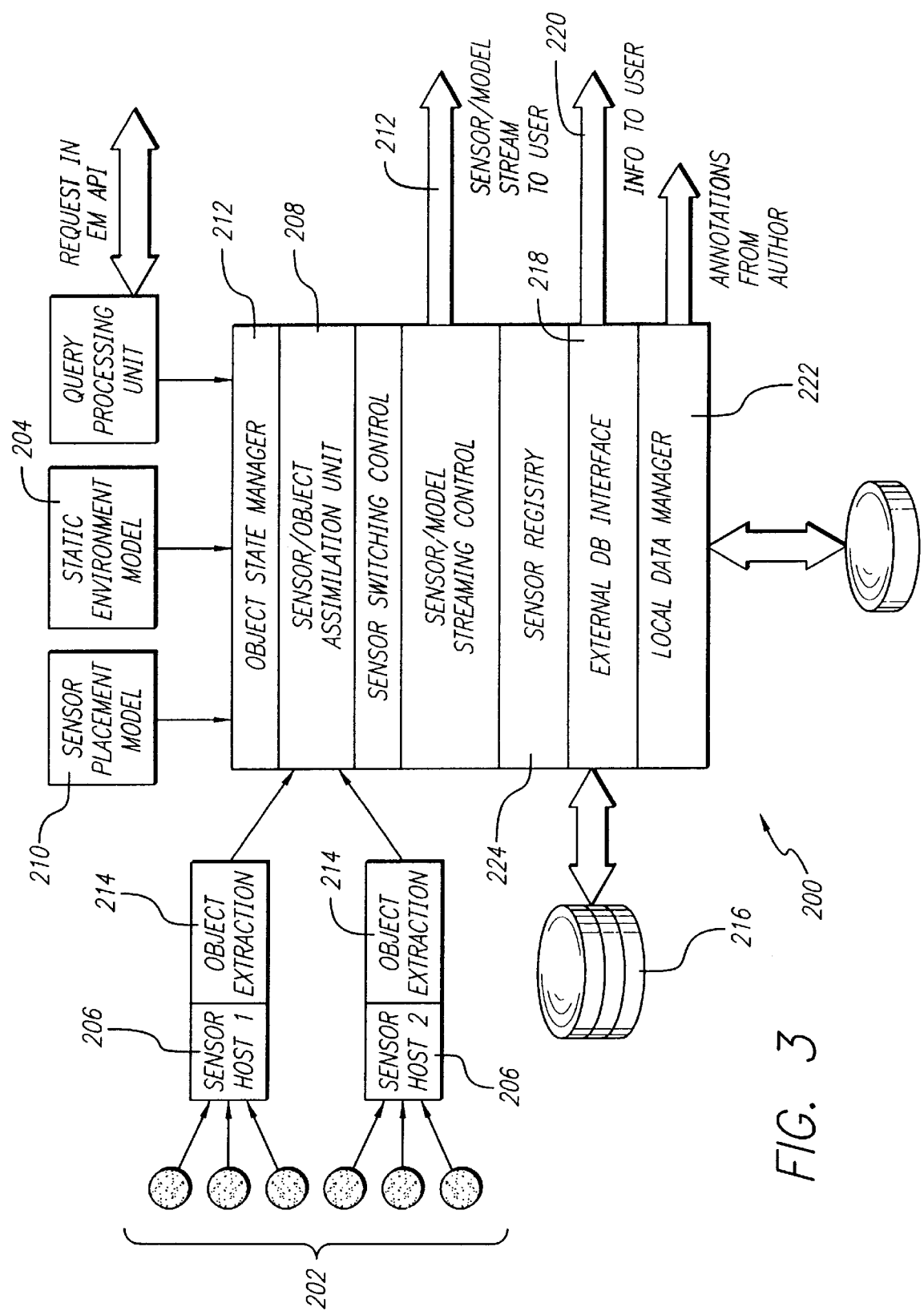
FIG. 3 shows the architecture of a content-based multi-media information system adapted for use with the present viewer invention.

An Exemplary Multi-media Interactive System for Use with the Present Inventive Viewer A system architecture of a content-based, live or recorded information system offering highly flexible user interactivity is shown in FIG. 3. The multiple multi-media interactive system 200 of FIG. 3 is referred to herein as a "Presence" system. The system 200 is so named because it provides users a novel means for interacting with multiple streams of multi-media information, enabling the users a new and exciting means for experiencing places and events in real-time, from user controlled perspectives. The presence system 200 shown in FIG. 3 (and variations thereof) blends a myriad of technologies such as heterogeneous sensor fusion, live-media delivery, tele-presence, and information processing into a novel set of functionality. The presence system 200 allows users to perceive, explore, query, and interact with remote, live environments using specially designed client applications. Such diverse applications include, but are not limited to: tele-visiting (e.g., tele-visits to day care centers, assisted living quarters, and other passive observation environs via a networked computer), tele-tourism (e.g., to art museums, galleries, and other interesting attractions), interactive distance entertainment (e.g., concerts, sports events etc.), interactive security systems, next-generation videoconferencing, and advanced and flexible viewing of recorded video and multi-media programming.

The presence system 200 does not simply acquire and passively route sensor content to users as is done by video streamers and Internet or web cameras. Rather, the system 200 integrates all of the sensor inputs obtained from a plurality of sensors 202 into a composite model of the live environment. This model, called the Environment Model (EM), is a specialized database that maintains the spatial-temporal state of the complete environment as it is observed from all of the sensors taken together. By virtue of this integration, the EM holds a situationally complete view of the observed space, what may be referred to as a Gestalt view of the environment. Maintenance of this Gestalt view gives users an added benefit in that it is exported to a visualization tool at the client side of the program where, accounting for both space and time, it produces a rich, four-dimensional user interface to the real-world environment.

As described in more detail below, the presence system 200 includes software for accessing multi-sensory information in an environment, integrating the sensory information into a realistic representation of the environment, and delivering, upon request from a user/viewer, the relevant part of the assimilated information through the interactive viewer of the present invention. The presence system 200 of FIG. 3 is capable of supporting content-delivery systems of unprecedented intelligence and scope. At a minimum, the presence system should include the following mechanisms: (a) sensor switching; (b) object and object property controls; (c) event notification; and (d) information management. Each of these mechanisms is described in turn below.

Sensor Switching Mechanism

The presence system 200 of FIG. 3 preferably includes a sensor switching mechanism that allows the system 200 to process and assimilate input from a variety of sensors 202. The plurality of sensors 202 may include video sensors (i.e., video cameras), audio sensors (i.e., microphones), motion detectors, proximity sensors, and other sensor types. The sensor switching mechanism provides several advantages. It facilitates the addition of new sensors of the same type and the addition of new sensors having new operating characteristics. It also enables the system to incorporate the specific activation of sensors and signal processing schemes. For example, an infrared sensor may be activated only in low ambient-light conditions, and, for a specific sensor type, a special signal cleaning operation may be invoked, depending on the amount of infrared emission from the static objects or occupants in an environment.

When the system 200 is initially configured, an Environment Model (EM) process builds a skeleton static model 204 of the environment using sensor placement data. From this static model, the EM process can determine an operative range for each sensor 202 in the environment. For example, the EM process will deduce from a sensor's attributes the space in the environment that will be covered when an additional microphone is placed in the environment. During operation of the system 200, the sensor signals are received by a plurality of sensor hosts 206 associated with each sensor 202. The sensor hosts 206 comprise software servers that recognize the source of the sensor input data. In addition, the sensor hosts 206 may include signal processing routines necessary to process the sensor input signals. Each sensor host 206 transmits the sensor information, accompanied by a sensor identifier that identifies the appropriate sensor 202, to a sensor assimilation module 208. The sensor assimilator 208 uses a sensor placement model 210 to index an input with respect to space, and, if memory permits, with respect to time.

A viewer/user can select a given sensor 202 either by referencing its identifier or by specifying a spatial region and sensor type. In the latter case, the query uses knowledge about the sensor coverage information to determine which sensors 202 cover a specific region, and returns only the sensor of the requested type. The request is processed by switching the current sensor to the requested sensors and streaming them to a user via a distribution network 212. As described in more detail below with reference to the description of the inventive viewer, the user's display can present the outputs from one or more sensors. Depending upon the user application, the user interface will include a tool for selecting a spatial region of interest. In many applications, such as security monitoring of a small commercial environment, users may not constantly view a sensor stream. In fact, users might use a scheduler script that invokes a fixed pattern of sensors for a predetermined (or user-configured) period of time at either fixed or random time intervals. The user interface contemplated for use with the presence system 200 of FIG. 3 is described in more detail below with reference to the description of the present viewer invention.

Object and Object Property Mechanisms

The system 200 of FIG. 3 preferably includes mechanisms that specify, extract, and refer to objects and object properties in the EM. An object is defined as an observable entity having a localizable position and spatial extent at any point in time. An object in the EM may be "static", "moveable", or "dynamic". For example, consider a view of a room including walls, a chair, and a person. The wall is defined as static, the chair is moveable, and the person is dynamic. In addition to its spatial-temporal coordinates, an object may also have properties such as the color and texture. As shown in FIG. 3, the system 200 includes components (specifically, object extraction modules 214, an object state manager 212, and the sensor/object assimilation unit 208) for managing objects and object properties.

The presence system 200 preferably uses a simple yet extensible language for denoting positions, dimensions, containment (e.g., "the chair is inside the room"), and connectivity (e.g., "room A is connected to room B by door C") properties of spatial objects observed by the plurality of sensors 202. Thus, when a moveable object is repositioned, the configuration of the static model 204 is modified accordingly. The static model 204 provides significant semantic advantages. First, users can formulate queries with respect to tangible objects. For example, instead of selecting a sensor by specifying a sensor number or position, users can request (using a point and click method) the sensor "next to the bookshelf" or the sensor from which the "hallway can be completely seen." Second, the static model 204 allows for spatial constraints and enables spatial reasoning. For example, a constraint stating that "no object can pass through a wall" may help reduce location errors for dynamic objects.

The presence system 200 of FIG. 3 also has the ability to locate, identify, and interact with dynamic objects. In the simplest case, an identifiable mobile sensor, such as a wearable radio-frequency transmitter, can be used to localize a moving object. The sensor transmits the position of the sensor at every time instant. In the case of a child-care environment, each child could be fitted with such a transmitter. In a security monitoring application, employees and visitors could be fitted with transmitters as part of an identification badge. In these cases, the sensor itself identifies dynamic objects. This obviates any additional computation.

However, when such wearable sensors are undesirable or impractical, object location can be calculated by the system using a plurality of sensors. For example, consider the case of multiple video cameras observing a three-dimensional (3D) scene. If a moving object can be seen by more than two suitably placed cameras, it would be possible to determine an approximate location for the object in 3D space. In this case, localization of objects can be achieved using a two-step computational method. As shown in FIG. 3, each camera 202 transmits a two dimensional (2D) video signal to an associated sensor host 206. The sensor host 206, using the object extraction process 214, performs a coarse motion segmentation of the video stream to extract the moving object from the scene. Because the video stream is in 2D camera coordinates, the segmented objects are also extracted in 2D. The sensor host 206 transmits the extracted 2D objects to the sensor/object assimilator module 208, which, with the help of sensor placement information, computes the 3D position and spatial extent of the object. Segmentation errors, occlusions, and objects suddenly appearing from an unobserved part of an environment can lead to generic labeling of objects, such as "object at XY."

Complex queries relating to the objects extracted by the system 200 can be processed by referring to the static model 204 and various object attributes. For example, the system 200 can answer queries such as: "of these two observed objects, which one is object 3 that I saw before and which one is a new unseen object that needs a new identifier?" by referring to the static model and various object attributes. The presence system 200 can deduce the identity of the unknown object by using static model constraints and heuristic information. For example, it might deduce that region 2 is a new object, because object 3 could not have gone through the wall and was not moving fast enough to go through the door and reach region 2.

Spatial-temporal Database

As the EM locates every object at each instant of time, it forms a state comprising the position, extent, and movement information of all objects together. If the state is maintained for a period of time, the EM effectively has an in-memory spatial-temporal database. This database can be used to process user queries involving static and dynamic objects, space, and time. Some example queries that may be processed by the presence system 200 follow. "Where was this object ten minutes ago?" "Did any object come within two feet of the bookcase and stay for more than five minutes? Replay the object's behavior for the last 30 seconds and show the current location of those objects." Many other complex queries can be processed by the preferred system 200 as is described below with reference to the present viewer invention.

Best View

Another effect of object localization and, perhaps, its most important, is the ability of the presence system 200 to provide viewers/users content-based viewing of any objects, including dynamic objects. This feature increases the expressive capacity in user interactions by allowing users to view the model space from a direction of their own choosing. Users can also select a sensor-based view based on the objects that are visible by selected sensors. For example, the system 200 can automatically switch sensors based on a user-defined best view of a moving object. In addition, the system can display a sensor stream from a specific object's perspective (for example, in the case of an American football game, the system 200 can show the user "what the quarter back is seeing".

Semantic Labeling and Object Recognition

The system 200 also provides mechanisms that facilitate semantic labeling of objects and object recognition. As described above, an object can be localized by the EM, but it is not automatically identified with a semantic label (i.e., the 3D object number 5 is not automatically associated with the name "John Doe."). Within the system 200 the object label (e.g., "object number 5" in the previous example) uniquely identifies the object. When a user wants to specify the object, the system 200 allows the user to click on a mouse and provide a semantic label associated with the object. In this case, the EM does not maintain its semantic label. In an alternative approach, semantic labeling can be obtained by user annotation. After an object is annotated with a semantic label by the user at the user's interface system (i.e., at the "client side" of the system), the client-side version maintains the annotation throughout the lifetime of the object.

Those skilled in the machine vision arts will recognize that, while many object recognition techniques can be used in controlled environments, only a few fully automated algorithms are sufficiently robust and fast to be used in "live" or near-real-time environments. However, many well-known object recognition techniques can be effectively used by the presence system 200 of FIG. 3. For example, in one application, a user may draw a circle around an object and ask the system to track it. Such tracking operations typically use sophisticated algorithms in order to be sufficiently robust against object occlusion problems. The presence system 200 preferably uses relatively simple object classification techniques that are based upon computationally efficient object properties. For example, object properties such as 3D aspect ratios, color, and simple texture segmentation can be effectively used to classify and distinguish dynamic objects. For example, these properties can be used by the system 200 to distinguish a human being from a dog, and a player as belonging to team A and not team B (determined by the color of the player jerseys).

It is also possible to incorporate application-specific domain information when processing raw sensor data in order to extract more meaningful object information. For example, a special segmentation process can replace generic segmentation techniques that extract a dynamic foreground object from the background. The special segmentation process can be used to separate objects having a specific color from everything else in the scene. Similarly, additional information about a selected sensor can help inform the extraction of information from the selected sensor and thereby render the information more meaningful to the system. For example, consider a system 200 having an infrared camera 202. By using information about the detection range and attributes of objects under view, the object recognition task can be greatly simplified. For example, human beings radiate infrared energy within a distinct dynamic range, and therefore they can be easily recognized by the system 200 using one or more infrared cameras.

Event Notification Mechanism

The presence system 200 of FIG. 3 preferably includes an event notification mechanism or process that allows the system to recognize and report meaningful "events". As defined within the presence system 200, an "event" is a spatial-temporal state satisfying pre-defined conditions. Events can occur either instantaneously or over an extended time period. Unlike specific user queries, which users explicitly make from the client side of the system 200 (using the present viewer or some other user interface), events are treated as standing queries that the presence system 200 continuously monitors. When the event occurs, the client side of the system is notified by the system 200. In an ideal system, events would be semantic in nature, and actions (such as "touchdown in a football game" and "vandalism in a surveillance application") would be treated as events. However, in the system 200 shown in FIG. 3, semantic events are constructed from simpler more primitive events. These primitive events are useful in and of themselves.

Primitive events can be defined based on the following attributes:

Spatial region of interest (e.g., "notify if any object appears near the door").

Time interval (e.g., "notify if any object stays in any region for more than five minutes")

Object location (e.g., "notify if this object moves to any of the restricted areas")

Object property (e.g., "notify if an object of 25 pounds falls down, where falls down means its bounding volume changes from a vertically elongated shape to become horizontally elongated")

Signal property (e.g., "notify if there is human voice at night in this part of the building")

In one embodiment of the presence system 200, event notification mechanisms are provided using simple periodic queries. In systems having more complex needs, specialized "watcher processes" can be provided for each event. In one embodiment, the watcher processes execute on the sensor hosts 206. Alternatively, the watcher processes execute on an EM server or on the client server (not shown in FIG. 3). Executing the watcher processes on the EM server is advantageous because events can be detected after assimilation of all the pieces of information. However, when higher volumes of requests are present (and it is necessary to monitor larger environments) the processing is preferably distributed. In this embodiment, each sensor host 206 operates on a local environment model associated with each sensor host, and executes its own watcher processes.

The system 200 of FIG. 3 also preferably maintains some pre-defined event types that allow users to set different parameters. For example, for a given spatial region that the user is interested in monitoring, users can specify a polygon around the region. More complex events can be monitored by composing and combining primitive events.

Information Management Mechanisms

As described below in more detail, users can supplement the audio/video information provided by the sensors 202 with additional information (e.g., statistical data, text, etc.). As shown in FIG. 3, this additional information is made available to the system 200 via an external database 216 and an external database interface 218. The external database interface 218 exchanges information with an external database 216. When appropriate, the system 200 synchronizes and associates the information in the external database 216 with the data obtained from the plurality of sensors 202. The results of a query from a user are provided to the user over communication path 220. The external database interface 218 provides all of the synchronization processes necessary to communicate with the user via the communication path 220.

In applications having "live" environments, only very specific domain-dependent queries are forwarded to the external data source 216. However, the external database 216 and database interface 218 can also serve as a general gateway to standalone and online databases. Such an architecture is employed when the presence system 200 is used for replaying archived data. For example, as described below in more detail in reference to the description of the present viewer invention, in sporting events, users may request the viewing of player or team statistics in addition to video/audio information. Similarly, in a videoconference application, participants may request electronic minutes of the meeting for specific time intervals. Using the external database interface 218 (and/or the local data manager 222), the presence system facilitates user requests for synchronized multiple multi-media data types.

Communication Architecture

The system shown in FIG. 3 supports both the well-known UDP and HTTP communication protocols. In addition, streaming media can be delivered to a user in a user-selectable form, such as using the well-known "RealVideo®" from RealNetworks® or DirectShow® from Microsoft®. Alternatively, the streaming media can be delivered to a user using any video delivery format that is convenient to the user. In one embodiment, a client interface (not shown) is provided using a "world-wide web" (or Internet) server using well-known communication techniques. In this embodiment, communications with a client process is implemented using the well known HTTP method or an HTTP-like technique.

System Administration Functions

The presence system 200 performs a significant amount of bookkeeping, including tracking the services requested by each user, monitoring user access privileges, and roles. Of particular importance are access privileges to sensors and views. For example, in the surveillance of a bank, not every employee may have access to cameras installed in the safety vaults. In addition to user management, the system also facilitates the addition of new sensors to the registry (using a sensor registry mechanism 224) and the addition of new services (such as a video streaming service). In one embodiment, administrative functions are implemented using a logically distinct database.

System Tools

The system 200 shown in FIG. 3 includes several system tools that enhance and simplify the use of the system. Exemplary system tools include the following:

Sensor placement and calibration tools

Complex query formulation tools

Authoring tools

Sensor Placement and Calibration Tools

Sensor placement tools allow a site developer and system administrator to position sensors (whose properties are already registered within the system 200) in a virtual environment, and to experiment with the number, types, and locations of sensors, visualizing the results. In an alternative embodiment, the system tools interact with a system administrator to determine system requirements and recommend sensor placement. The sensor calibration tool calibrates the sensors after they have been placed. Thus, for each sensor, the administrator or developer can correlate points in the actual environment (as "seen" by that sensor) to equivalent points in the static environment model 204. In this process, several parameters of the sensors, such as the effective focal length, radial distortions, 3D orientation information, etc., are computed. Thus, the system 200 can accurately compute the 3D coordinates based upon dynamic objects obtained during a regular session.

Complex Query Formulation Tool

While the EM maintains spatial-temporal states of objects, events, and static information, users need a simple mechanism to query the system for information related to them. Queries must be sufficiently expressive to take advantage of the rich semantics of the content, yet simple to use. To facilitate the query process, the system 200 preferably includes visual tools that enable users to perform simple query operations (such as point and click on an object, a sensor, or a point in space, press a button, mark an area in space, and select from a list). From user inputs to these query formulation tools, complex query templates are "pre-designed" for specific applications. One example of such a query is: "if three or more dynamic objects of type human are simultaneously present in this user-marked area for more than one minute, highlight the area in red and beep the user until the beep is acknowledged." Although the query tool produces an output with several conjunctive clauses and conditions, involving point-in-polygon tests and temporal conditions, users need only perform actions such as marking a region of interest and specifying the number of dynamic objects to launch the complex query. The complex query tool is described below in more detail with reference to the present inventive viewing method and apparatus.

Authoring Tools

The system 200 of FIG. 3 preferably includes authoring tools that allow users to create multi-media content using either archival or live-sensory information, or both. This content-creation process preferably comprises authoring tools analogous to the Media Composer® from Avid® or Macromedia Director®, however, using live multi-sensory (and perhaps archival) information. For example, consider the case where a user wants to author a sports show in which significant basketball games of the year 1998 are discussed. The user would use the system 200, and specifically utilize a "playback" mode and a tool having components capable of composing the show. These components allow the system 200 to perform the following functions:

Provide authors a mechanism for marking highlights and end users a mechanism for "jumping" to these highlights ("hypervideo").

Capture 3D snapshots of the game at either regular intervals or at carefully chosen time instants and present them to the end users like a storyboard of key frames, allowing them to play back a game from those time instants.

Pre-compute the tracks (using expensive semi-automatic algorithms, if required) of game scorers and other players assisting or opposing them, such that the end user can follow the game's best view of those movements.

Connect to external information sources to annotate specific objects or events with text, audio, or other video.

Details of the authoring tools and their use in a user interface are provided in more detail below with reference to the inventive viewing method and apparatus. A specific adaptation of the presence system 200 of FIG. 3 is now described below with reference to FIGS. 4–6. This adaptation includes one preferred embodiment of the present inventive viewer. However, those skilled in the user interface arts will recognize that several alternative embodiments of the present viewer and associated multi-media system may be used without departing from the scope of the present invention.

Figure 4:
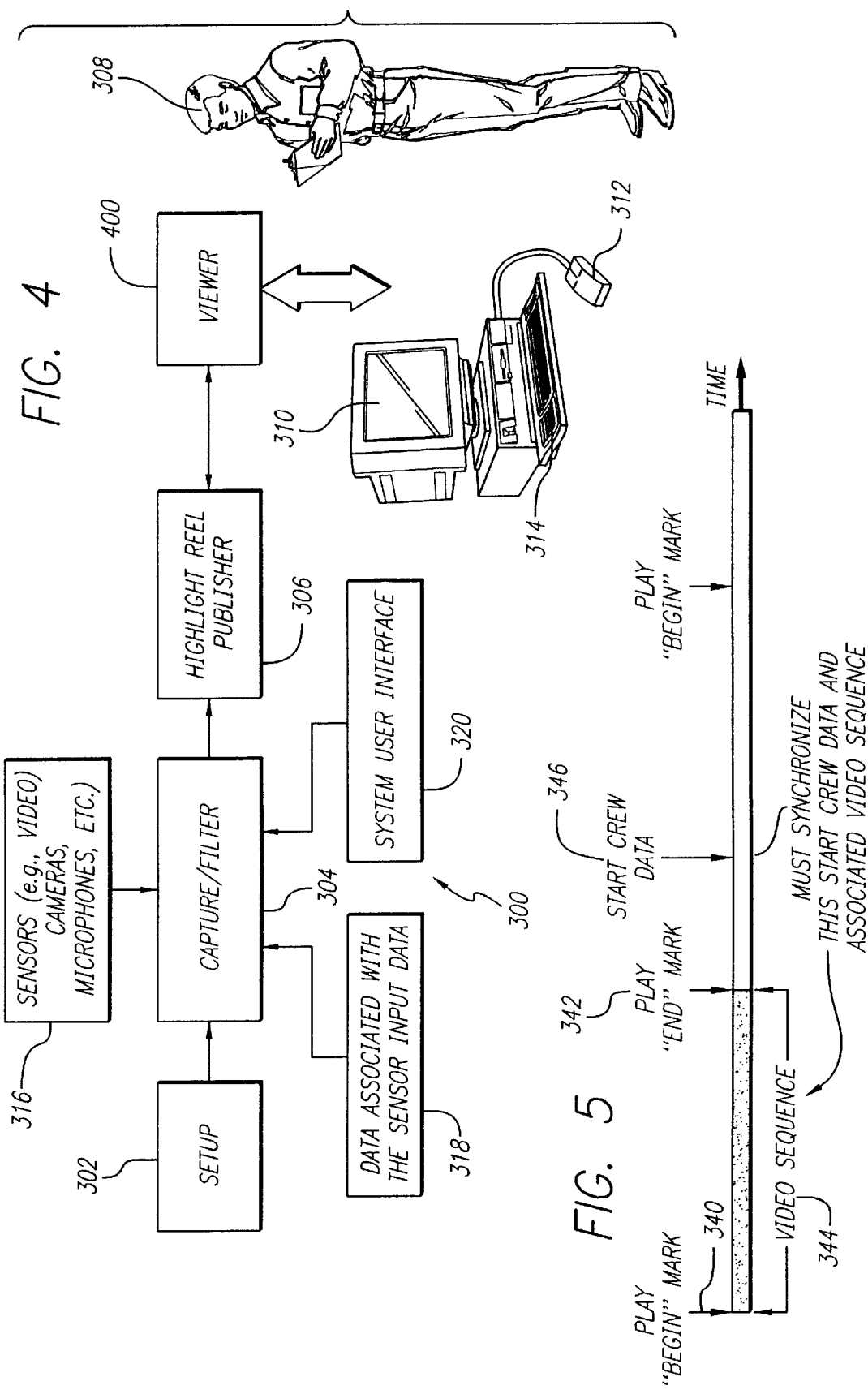
FIG. 4 shows some of the processes performed by a preferred embodiment of the multi-media system of FIG. 3.

A Preferred Embodiment of the Multi-media Interactive System for Use with the Present Inventive Viewer In accordance with a preferred embodiment of the present invention, the present viewing method and apparatus comprises one of several inventive multi-media processing components of an interactive multi-media system similar to that described above with reference to FIG. 3. The preferred interactive multi-media system includes four major components or processes as shown in FIG. 4. Throughout the remainder of this specification, the preferred interactive multi-media system is described in the context of American football programming. However, the preferred multi-media system and present viewer invention can be used to facilitate interactivity with a wide range of multi-media programming. Therefore, although the remainder of this specification describes the present invention in the context of an American football game, those skilled in the art will recognize that the viewer can be modified to allow interactivity to several different types of media programs.

As shown in FIG. 4, the preferred interactive multi-media system 300 includes a Pre-game Setup process 302, a Capture and Filtering process 304, a "Highlight Reel" Publisher process 306, and the inventive viewer process 400. In the embodiment shown in FIG. 4, the pre-game setup process comprises a utility program that is used prior to the commencement of a media event (e.g., a football game). The setup process 302 works together with the capture and filtering process 304 to automate the creation of a "highlight reel" for subsequent viewing by a user/viewer 308. In one preferred embodiment, a highlight reel is defined as a set of "important" or extraordinary plays (i.e., video clips) that are gleaned from an entire multi-media program such as an American football game. The highlight reel is "published" by the highlight reel publisher 306 and provided as input to the inventive viewer method and apparatus 400. As described in more detail below, in one preferred embodiment of the present invention, the highlight reel is published to the well-known Internet to be subsequently obtained by the viewer process. In this embodiment, the inventive viewer process 400 executes on a computer located at a user/client's home or business. The viewer 400 causes information and multi-media information to be displayed on a user display 310 to be viewed by a user/viewer 308.

As shown in FIG. 4, the capture/filter process accepts sensory inputs from a plurality of sensors 316 positioned proximate the media event to be viewed (e.g., cameras, proximity sensors, and microphones are positioned around a football field). Similar to the system 200 described above with reference to FIG. 3, based upon the "raw" data that is input to the capture/filter process 304, the process 304 creates a powerful relational/object-oriented database that synchronizes all of the multi-media data types together and that provides indices to each associated data type. For example, the capture/filter process can accept and subsequently synchronize the following diverse input data information streams: (a) multiple "live" video information streams from each camera positioned near the media event (e.g., a football field); (b) multiple "live" audio information streams from each microphone positioned near the media event; (c) play-by-play audio and statistical information streams associated with the media event; (d) information specific to the media event such as player rosters, statistical data, etc.; (e) any other live inputs obtained by sensors located proximate the media event. All of these diverse data types are linked together by the capture/filter process during the creation of a multiple data type multi-media database.

As described above with reference to FIG. 3, this relational database preferably comprises a spatial/temporal database. The system 300 effectively includes an environment model that maintains the spatial-temporal database. As described above, this database can be used to process user queries involving static and dynamic objects, space, and time. The details of the creation of this database and implementation of the capture/filter process are beyond the scope of the present viewer invention. However, to fully appreciate the flexibility and operation of the present invention, the functions performed by the capture/filter process are briefly described.

Setup Process

As shown in FIG. 4, the capture/filter process 304 accepts inputs from the pre-game setup process 302. In order to automate the creation of the highlight reel, the setup process 302 provides a set of pre-defined filtering criteria as inputs to the capture/filter process 304. To facilitate this automation process, the system 300 preferably prompts a system user for input of a variety of data associated with the game. This game data may include player names, team statistics, and other filtering criteria. A comprehensive list of these data types is provided below in Table 1.

TABLE 1

List of Data Requested by System during Pre-Game Stage

| Game | Team | Players | Advertisement | Camera |
|---|---|---|---|---|
| ■ Name | ■ Names | ■ Name | ■ Name | ■ Name |
| ■ Description | ■ Description | ■ Number | ■ Description | ■ Description |
| ■ Icons | ■ Icons | ■ Icon | ■ Banners | ■ Icon |
| ■ Advertisements | ■ Statistics | ■ Position | ■ Icon | ■ Coverage areas |
| ■ # of video sources | ■ Player List | ■ Description | ■ Video clips | |
| ■ # of audio sources | ■ A/V clips | ■ Statistics | | ■ Audio |
| ■ 2D/3D model | | ■ A/V clips | | ■ Type |
| ■ figures (diagrams) | | | | ■ Calibration |

| Filtering Criteria | Stadium | Officials | Special Plays | |
|---|---|---|---|---|
| ■ Scoring play (TD, FG, 2pt-conversion) | ■ Name | ■ Referee data | ■ Misc.plays | |
| ■ Erroneous plays (interceptions, fumbles, sacks) | ■ Icon | ■ Icons | | |
| | ■ Description | ■ Descriptions | | |
| | ■ History | | | |
| | ■ A/V clips | | | |
| ■ Extraordinary plays (rushes > X yds, Pass > X yds) | | | | |

Not all of the data requested by the system 300 during this stage of processing need be entered by a system user in order for the system to function properly. However, the efficiency of the database creation process is improved when more information is provided during the setup process (i.e., when a greater number of pre-game data types are input to the system). In one preferred embodiment of the present invention, a system user uses a simple tabbed panel format to provide access to the different data types. The entire pre-game setup stage is preferably accessed by the user using either a well-known "pull-down" menu and/or a drag-and-drop metaphor technique. Once the data types have been defined for a particular user and media program, the user can save the entries as a "project" for storage in a system hard disk. Moreover, projects can subsequently be retrieved and used as a template for other projects. The filtering criteria provided during the setup stage aids the capture/filter process in automatically creating the spatial/temporal database. The filtering criteria specified by the user define all of the "important" plays to be subsequently stored as a highlight reel.

Capture/Filter Process

Those skilled in the multi-media programming arts will appreciate that not every portion of a multi-media event is significant or important to the end user. In fact, often only a very small percentage of an entire multi-media program contains sufficiently interesting material warranting further processing and eventual viewing by an end user. In American sports broadcasting vernacular this small percentage of programming comprises important or extraordinary plays and is referred to as "highlights". Similarly, in news broadcasting vernacular these significant multi-media events are referred to as "sound-bites". Due to the tremendous volume of data that is generated by a typical multi-media program (it is well-known that digitized video data alone requires massive data processing and storage capability) a data filtering function is both desirable and required. This filtering function helps eliminate or "strip-away" multi-media data (largely video information) that is relatively unimportant to the end user. In modern-day broadcasting, a producer or broadcast editor typically performs this filtering function manually using sophisticated video and audio editing systems. Disadvantageously, this editing/filtering task is time consuming, laborious and requires a certain degree of skill and expertise in the multi-media processing arts. Therefore, the capture/filter function 304 is provided in the preferred embodiment of the multi-media system 300 of FIG. 4 to help automate the filtering/editing process.

As shown in FIG. 4, the capture/filter process 304 preferably accepts "live" or "raw" sensory data inputs from a plurality of sensors 316 positioned proximate the media event. For example, in the case of an American football game, the plurality of sensors includes several video cameras positioned at different viewing perspectives around the football field. The sensors might also include a plurality of microphones and proximity sensors as described above with reference to the MPI system and the presence system of FIGS. 1 through 3. The filter process is controlled both by inputs provided by the setup process 302 described above, and by inputs provided by a system user via a system user interface 320. In one particular embodiment of the interactive multi-media system 300, the capture/filter process is implemented in a computer workstation. In this embodiment, a system user interacts with the system 300 and interacts with the capture/filter process 304 to mark the beginning and ending or particular multi-media events such as football plays. A wide variety of filtering criteria can be provided depending upon the multi-media programming.

For example, in one preferred embodiment, the capture/filter process 304 includes a "personality module" (not shown in FIG. 4) that is specific to a multi-media program to be processed by the system 300. The personality module is specifically designed to provide the capture/filter process 304 with pre-determined and pre-defined knowledge concerning the multi-media program processed by the system. The pre-determined knowledge aids the capture/filter process 304 in creating a multi-media database that is indexed by (in addition to other indices) programming events. For example, in one embodiment, the personality module comprises a "football" utility. In this case, the personality module comprises a utility process that can identify key events such as fumbles (i.e., sudden change of possession from one team to the opposing team), touchdowns, etc.

Alternatively, the module may provide knowledge relating to basketball, tennis, etc. The capture/filter process 304 uses the personality modules to further define, filter and interpret the sensory, filter criteria and other data provided as inputs to the system. The capture/filter process 304 thereby automatically assimilates and synchronizes these diverse data types to create a powerful yet very flexible multi-media database indexed by multiple multi-media events.

In the example of an American football program, the capture/filter process 304 accepts as input all of the video data streams provided by each video camera positioned proximate a football field. Additional inputs are provided by the setup process 302 and by additional data sources 318. An example of an additional data source in the football example is a "Stat. Crew" data stream comprising continuous "play-by-play" statistical data associated with the football game under view. Examples of Stat. Crew data include derived statistical information such as "yards per carry" for a particular player, completions and interceptions for a particular quarterback, etc. Game clock information can be recovered from the Stat. Crew data stream. The Stat. Crew data is parsed by the capture/filter process 304 and subsequently associated with an appropriate video sequence output by one of the video cameras 316.

As shown in FIG. 4, the capture/filter process 304 also accepts inputs from a system user via the system user interface 320. The inputs provided by the system user preferably include annotation data and control information. The annotations supplement, rather than replace the Stat. Crew data. In the American football example, such user-provided annotations may include the following: play-by-play-down count number; play-type typically entered by selecting from a menu; identity of key players, and system hints regarding the players that should be present on the football field during certain types of plays.

The system user interface 320 also allows a system user to aid the capture/filter process 304 in filtering the raw input and thereby creating a multi-media database. For example, in one preferred embodiment, the system user provides inputs that define event starting and ending points by providing "record" and "stop" control inputs to the system 300. The control inputs also include "delete", "save", and "override" controls. Thus, the capture/filter process 304 can be manually controlled and overridden by a system user. In a basic configuration of the interactive multi-media system 300, a system user observes the raw input provided by the sensors 316 (e.g., by observing the live video streams provided by the cameras) and instructs the capture/filter process 304 when to digitally record a multi-media "event." In this configuration, the system user instructs the system when to begin (and subsequently, when to stop) digitizing the raw video and audio feeds that are output by the sensors 316. This process is shown diagrammatically in FIG. 5.

When the capture/filter process 304 receives an "event start" command from the system user it begins digitizing the multi-media data (typically audio/video data streams) input by the plurality of sensors 316. In the American football example, an event comprises an important play (such as a touchdown). The capture/filter process 304 "marks" the beginning of the event or "play" at time 340. The "event end" command causes the capture/filter process 304 to either stop recording the play or "mark" the ending of the event or play at time 342. Thus, a video sequence 344 of the event (play) is defined within the system 300 by the beginning and ending points. Another event is digitized by the system when the system user inputs a second "event start" command at time 348. In one preferred embodiment, the capture/filter process 304 includes an auto "end event" mechanism ("time-out") that automatically marks the end of an event (play) after a pre-determined time period.

Figure 5:
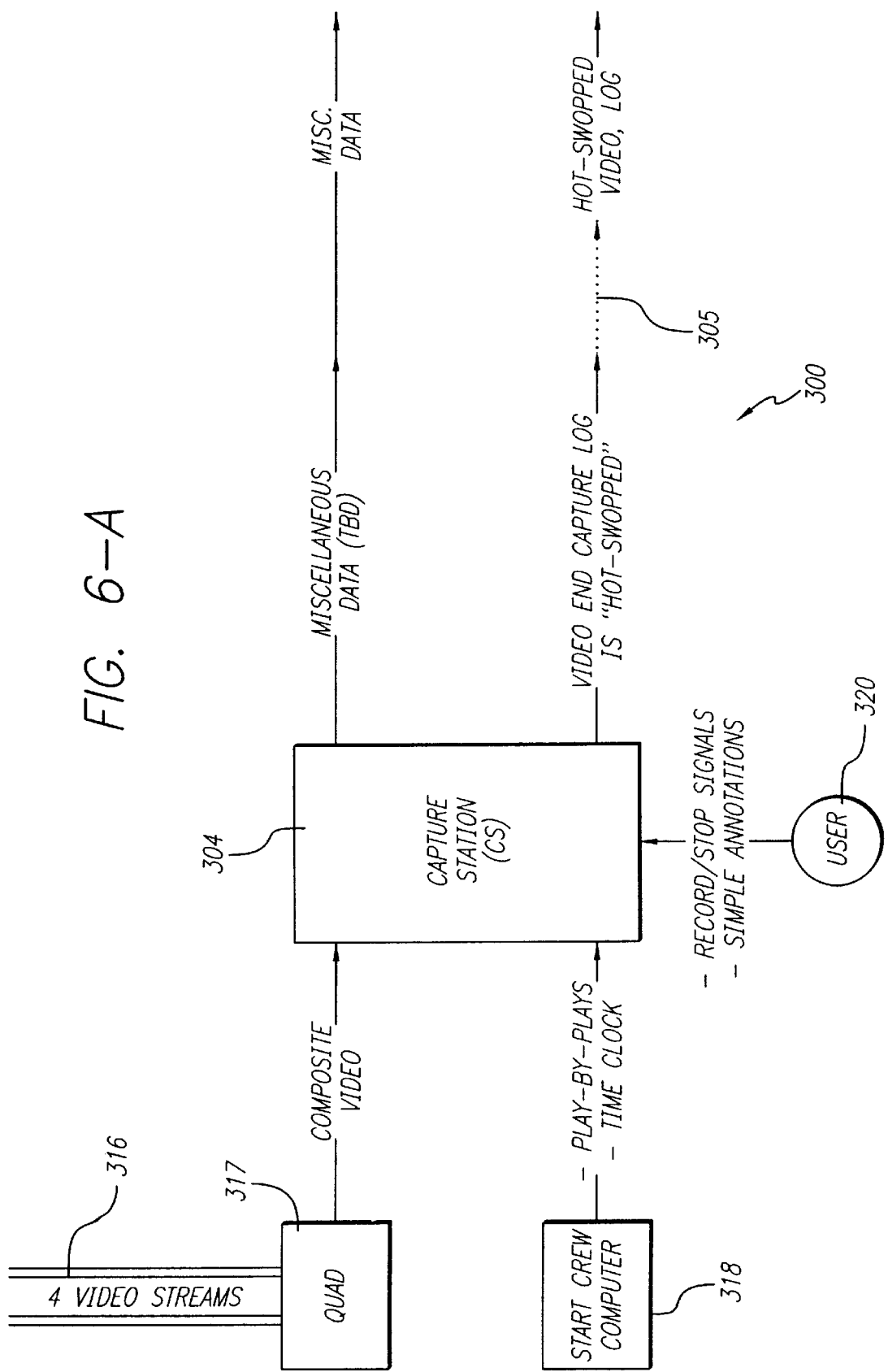
FIG. 5 shows details of the capture/filtering process shown in FIG. 4.

As shown in FIG. 5, the Stat. Crew data 346 associated with the recorded event 344 is synchronized with the event by the process 304. The system 300 thereby creates a database that synchronizes and associates multiple multi-media data types (such as video, audio, proximity sensor signals, and statistical information) with multi-media events of interest to an end user or client (such as fumbles, interceptions, etc.). These data types are stored and managed by the multi-media system in a relational object-oriented multi-media database. Due to the massive storage requirements associated with the video events digitized by the system, a set of filtering criteria are preferably provided which are used to eliminate insignificant events. In the football example, most plays are not worthy of being published in a highlight reel. Therefore, the capture/filter process 304 filters the data to eliminate events that do not satisfy the criteria specified by the user. For example, in one preferred embodiment, the following filtering criteria can be specified: (a) scoring plays (such as touchdowns, field goals, safeties, and two point conversions); (b) erroneous plays (such as interceptions, quarterback sacks and fumbles); (c) extraordinary plays (such as $4^{th}$ downs that are not punts, passes and rushes greater than a specified number of yards, (d) key players can be specified (e.g., record all passes that player X caught), and (e) other user-defined plays. In the preferred embodiment, the filtering criteria can be established using Boolean operations based upon a set of primitive filtering constraints.

In one preferred embodiment of the interactive multi-media system 300, two modes of event filtering are accommodated. In one mode, if the recorded video clip does not meet the filtering criteria it is immediately discarded from an internal system storage facility. In an alternative filtering mode, if the video clip does not meet the filtering criteria, it is saved on a system storage means or hard disk. However, the highlight reel publisher process 306 disregards the video clip and thereby does not include the clip in a highlight reel. The video clip is saved in a separate system folder or storage location and may subsequently be retrieved if desired.

In addition, as described above, the system user can annotate or control the creation of the multi-media database using user inputs and control means. For example, in the American football example, extraordinary plays may occur during the game that do not meet the pre-defined filtering criteria initially provided to the system (e.g., a short gain that is otherwise insignificant except for the fact that it breaks a rushing record). In this case, the system user may "manually override" the capture/filter process 304 and "force" the system 300 to include the play as an event for subsequent retrieval. In addition, the system user may annotate the play with data that describes the significance of the event. In one embodiment, the system user will be given a pre-defined time period (e.g., ten seconds) in which to manually override the filtering process. If no override signal is received, the filtering process occurs using the filtering criteria as described above.

Highlight Reel Publisher Process

As shown in FIG. 4, the preferred embodiment of the multi-media system 300 includes a highlight reel publisher process 306. As described above, the capture/filter process 304 removes all of the unimportant events (or plays, in the football example) from the multi-media database. Therefore, the remaining events are "highlights" and are effectively ready to be published as a "highlight reel." However, in many cases, a user may wish to manually edit or trim the video sequences to conserve disk space and communication bandwidth. In contrast, a system user may want to append advertisements or other multi-media information to the "highlight reel". In one embodiment, the highlight reel publisher process 306 essentially produces two data types: video clips and Internet "web" page information. The worldwide web page information includes the following: information relating to the web page layout (preferably written in the well-known HTML format); two-dimensional images of graphs, advertisements, etc.; and a query data file containing all possible queries available to a client user 308. This information is provided as input to the viewer process 400 of the present invention.

Figure 6:
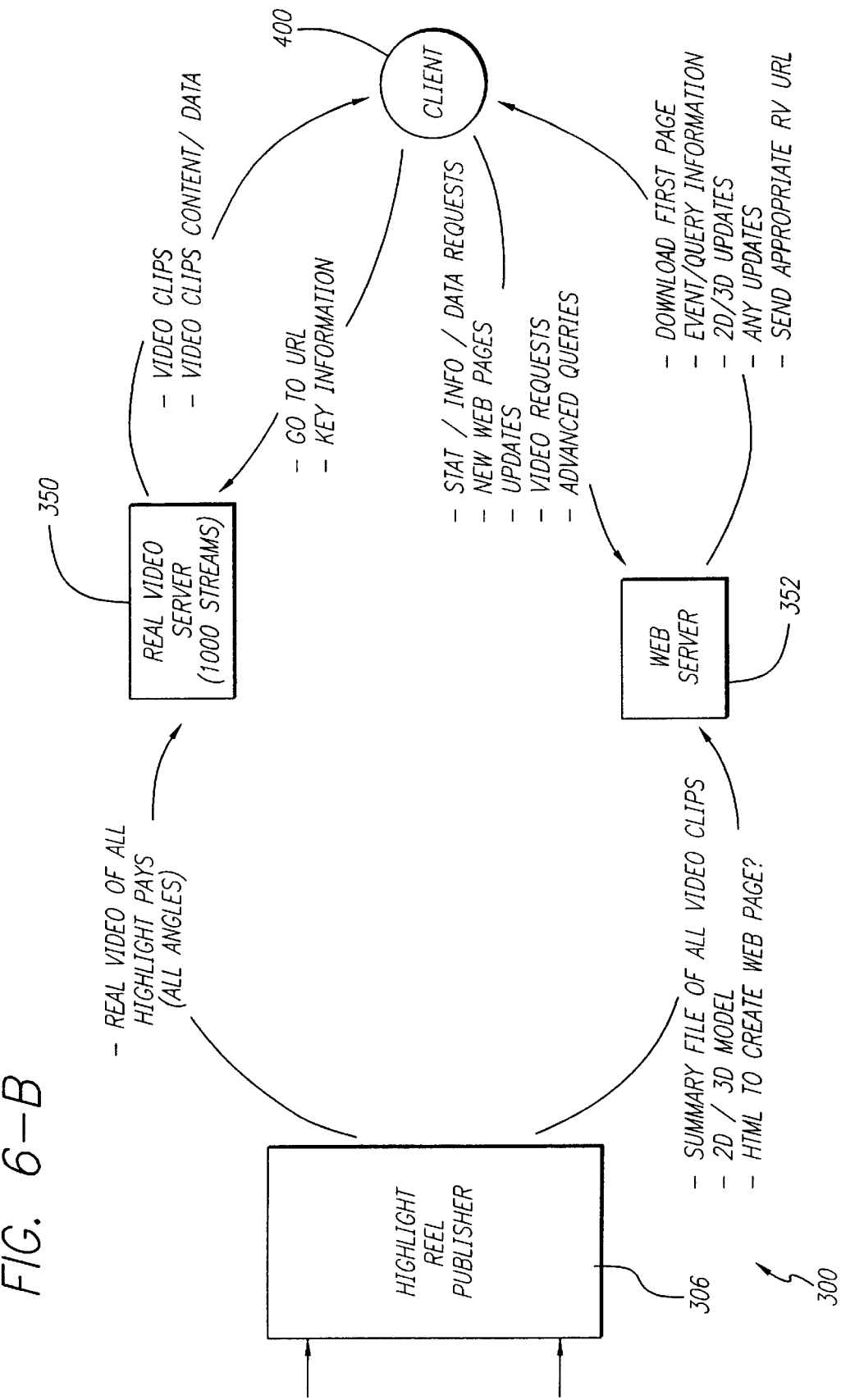
FIG. 6 shows the flow of information between the processing blocks of the multi-media system of FIG. 4.

FIG. 6 is a block diagram of the multi-media system of FIG. 4 showing the flow of information between the various processing blocks previously described. In the embodiment shown in FIG. 6, four video streams of information from four video cameras 316 are input into a quad splitter block 317. The quad splitter 317 creates a new composite video signal based upon the four input video streams. The composite video signal splits a video display into the four video signals at one quarter their original size. This composite video signal is provided as input to the capture process executing on a capture station (CS) 304. In addition, a Stat. Crew computer 318 provides statistical information (such as the time clock) to the CS 304 as described above. In the preferred embodiment, both the CS and the highlight reel publisher 306 comprise standard mini-tower desktop personal computers.

The CS 318 builds a fully synchronized multi-media database as described above based upon the audio, video, statistical data and other data that are input to the CS 318, and also based upon the filtering criteria and other inputs provided by a system user via the system user interface 320. This database is preferably stored in the CS 304 in a "hot-swappable" A/V hard disk. In the preferred embodiment, the CS hard disk is "hot swapped" (i.e., physically removed and inserted into the highlight reel publisher computer 306 without shutting down the computer) into the highlight reel computer's hard disk bay. Alternatively, a high speed connection 305 can be used to transfer the CS-created event database to the publisher 306. An exemplary high speed connection comprises the well-known 100 BaseT Ethernet® communications link. However, other high speed links can be used.

As shown in FIG. 6, in one preferred embodiment, the highlight reel publisher 306 communicates with a client (via the present viewer invention 400) over the Internet. In this embodiment, the client, via the inventive viewer process 400, communicates with both a real video server 350 and an Internet world-wide web server 352. Both the real video server 350 and the web server 352 are preferably maintained by an Internet server provider (ISP). As described below in more detail with reference to the inventive viewer method and apparatus, the real video server 350 downloads video clips to the viewer in response to user queries. The web server 352 provides all other information including instructions for building and maintaining a web page, 2D and 3D model information, event/query information, and real video URL information. As described below in more detail, in one embodiment, the inventive viewer executes on a client's computer (e.g., a desktop computer 314 located at the client's home or business). In this embodiment, the user 308 launches a viewer installer program that installs the inventive viewer on the user's computer 314 and registers with both the web server 352 and the real video server 350. The details related to the implementation and operation of the present viewer invention are now described with reference to FIGS. 7–9.

Figure 7:
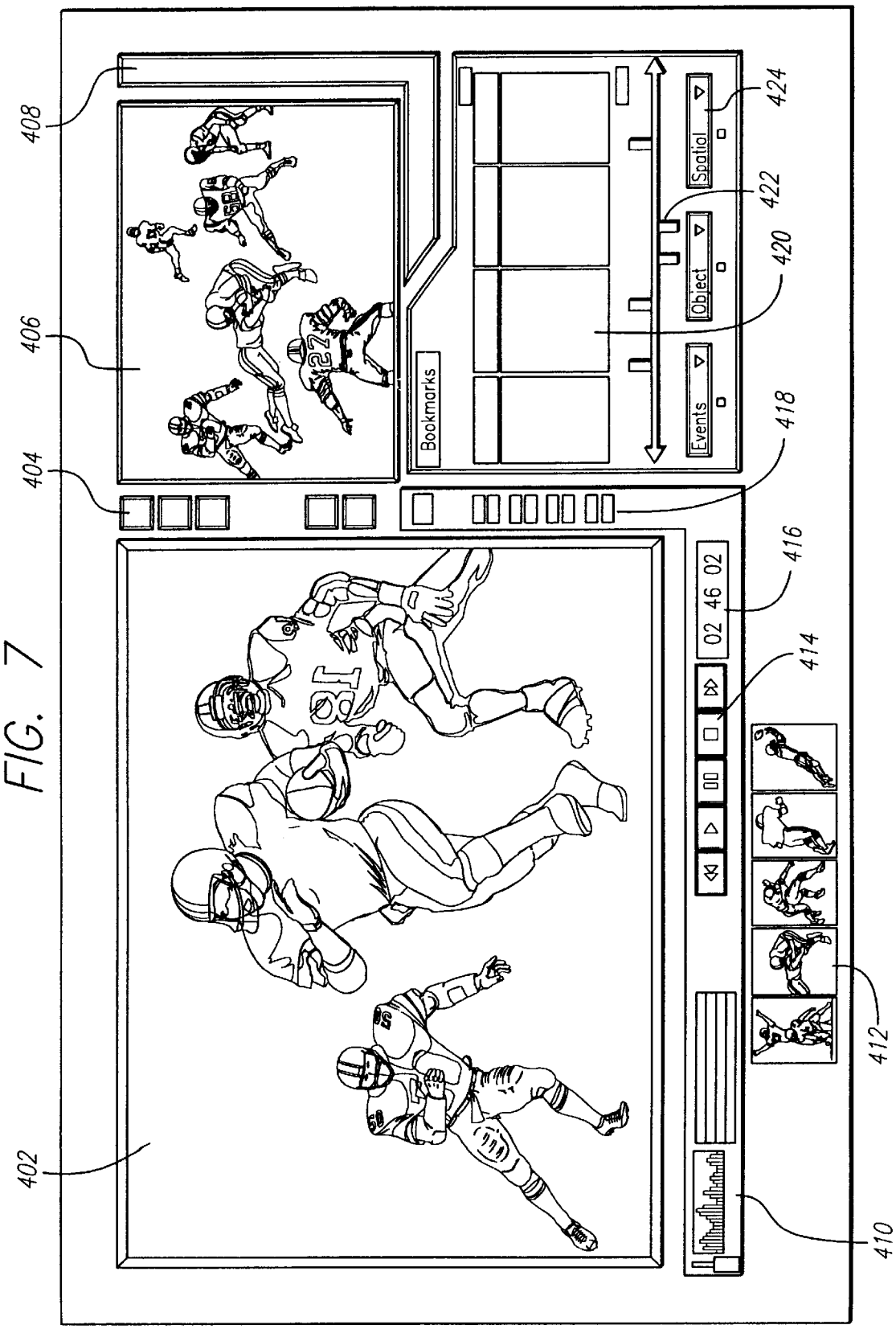
FIG. 7 shows the display generated by the interactive viewer method and apparatus of the present invention.

Integrated Multi-perspective Viewer for Content-based Interactivity—The Preferred Embodiment FIG. 7 shows a typical display 401 generated by the present inventive interactive viewer method and apparatus 400 of FIGS. 4 and 6. In the embodiment of the interactive multi-media system 300 described above with reference to FIGS. 4–6, the viewer 400 outputs the display 401 of FIG. 7 on a user's monitor such as the user monitor 310 of FIG. 4. The display 401 preferably comprises a plurality of multi-media information viewing areas or windows. A description of each information viewing area is set forth below in more detail.

As shown in FIG. 7, the display 401 output by the preferred embodiment of the viewer 400 includes a video window 402, a miscellaneous user input button area 404, a model window 406, a model navigation area 408, an audio control area 410, a "bookmark" bin area 412, a context-sensitive "video-cassette recorder" (VCR) control area 414, a time code viewing area 416, a camera angle (perspective) control area 418, a statistics and information viewing window 420, a time-line display and indexing area 422, and a query processing area 424. Those skilled in the computer user interface arts will recognize that the specific arrangement of the viewing areas (402–424) shown in FIG. 7 are exemplary only and can vary in size and position without departing from the scope of the present viewer invention. For example, the video window 402 can be smaller, larger, or be positioned elsewhere within the display 401 (e.g., positioned where the model window 406 is shown). In addition, the display 401 preferably uses a wide variety of colors, fonts, passive and active (e.g., blinking on and off) indicators to aid the user in accessing information stored in the multi-media database. The particular arrangement and description of the colors, fonts and passive/active indicators presented herein are exemplary only, and should not be interpreted as limiting the scope of the present viewer invention. Each of the viewing areas or windows is now described in more detail.

Video Window

The video window 402 is used by the inventive viewer 400 to display video clips that were previously digitized by the multi-media system. In one embodiment, the video window is 640 by 480 pixels in dimension. However, depending upon the rates that the real video server 350 (FIG. 6) transmits the video clips to the viewer 400, the video window may vary in size and video refresh rate. For example, in one embodiment using a video transmission rate of 28.8 kilobits/sec, the video window is 160×120 pixels in dimension and has a video refresh rate of 6 frames per second. In another alternative, using a video transmission rate of 56 kilobits/sec, the video window is 320×240 pixels in dimension and has a video refresh rate of 6 frames per second. The video clips stored in the system database are preferably encoded using a well-known video encoding and compression method. For example, in one embodiment, the video clips are encoded using the Real Video® encoding method. As described in more detail below, the video window is used to display the various video data streams that are acquired from the plurality of video cameras 316 (each having different viewing perspectives of the multi-media program) positioned proximate the live multi-media program. Video clips of different selected players, plays (events), and objects are displayed by the viewer 400 in the video window 402.

Miscellaneous User Input Buttons

As shown in FIG. 7, the display 401 that is generated by the viewer 400 preferably includes an area for displaying miscellaneous user control buttons 404. The control buttons 404 allow a user (e.g., the user 308 of FIG. 4) to interact with the viewer 400 causing the viewer to change various aspects of the display 401. These buttons are typically selected by the user using a convenient user input selecting device such as the mouse 312 shown in FIG. 4. For example, when a mouse is used, the user simply "points and clicks" the mouse in a well-known manner to select a desired control button 404 on the display 401. Alternatively, other well-known user input means can also be used to select the control buttons 404. The control buttons 404 provide the user a convenient means for instructing the viewer 400 to change the appearance of the display 401. For example, one control button 404 can be used to interchange or "swap" the displayed locations of the video window 402 and the model window 406. The same control button can be "toggled" to swap the displayed locations back to their appearance as shown in FIG. 7. Another control button is preferably provided which allows the user to freeze a video frame and in essence "take a snapshot" of the video image displayed in the video window 402. The still frame can be stored in the user's computer in a well-known format such as the JPEG or TIFF formats. Other user control buttons are included that: provide user "bookmarks"; display or hide the model window 406; generate a "preferences pop-up" window; zoom in/out of the video window 402; provide full-screen playback in the video window; and perform a "hyperlink" toggle function.

Model Window

The viewer of the present invention preferably generates a model window 406 that displays in two dimensions a 3D model of the event being displayed in the video window 402. As described above with reference to FIGS. 1–6, the multimedia system preferably creates and maintains a 3D model of the multi-media program (in the example shown in FIG. 7, a football game) being viewed. This model, referred to above as the environmental model, is a specialized database that maintains the spatial-temporal state of the complete environment observed from all of the sensors taken together. The 3D model comprises a complete view of the observed space. As described in applicants' co-pending U.S. application Ser. No. 091008,272, filed Jan. 16, 1998, entitled "3-D User Interface", which has been incorporated by reference herein, the 3D model provides a user interface that is capable of interacting with a multiple perspective interactive video system at a three-dimensional level. The user interacts with the multi-media system by pointing and clicking on objects displayed in the 2D model window 406. As described in the 3-D User Interface co-pending application, these objects are linked to the objects in the 3D model that is maintained by the multi-media system. In turn, the 3D model of the real-world environment contains information about real-world environment that is observed by the cameras and other sensors.

As described in the co-pending 3-D User Interface application, the real-world environment has a static component, consisting of a model of the static components of the environment, which resides in the multi-media database of the multi-media system. The database also contains a library of possible dynamic objects that can appear in the environment. Multiple video sensors capture data from the real-world environment and the system dynamically reconstructs a 3D model from the video streams using well-known computer vision techniques. The user is able to manipulate the 3D model to obtain desired perspectives and/or data pertaining to the real-world environment. The 3D model represents the sensed real-world environment. The spatial coordinates of the 3D model approximately correspond to the spatial coordinates of the sensed real-world environment.

As described in the co-pending application, the user interface displays a 2D model window 406 on the visual display 401. The 2D model corresponds to the 3D model of the real world environment. The user thereby interacts and manipulates the 3D view by interacting with the 2D view of the real-world environment shown in FIG. 7 as the model window 406. Based on input received from a user, the 3D model is manipulated to select a two-dimensional view of the sensed real-world environment. In addition to changing the video clip displayed in the video window 402, all other windows and display information related to the selected event and or object are concurrently displayed to the user. Therefore, the present viewer 400 advantageously synchronizes and tracks all of the multiple multi-media data types associated with a particular viewing perspective and selected event. The user simply needs to point and click on a particular object, event, or spatial region in the 2D model, and all of the windows of the display 401 are appropriately modified to display the requested information.

In one embodiment, the model window preferably comprises a 320 by 240 pixel display window. However, this window can be optionally re-sized by the user to any convenient viewing dimension. In addition, the model window is included in the display 401 as a "plug-in" feature. That is, the window is optional. It can be replaced by another window displaying well-known applications such as spreadsheet, word processor, or presentation applications. In addition, the model window 406 can be replaced with another display window capable of displaying advertisement information.

Model Navigation Controls

As shown in FIG. 7, the display 401 preferably also includes a viewing area that facilitates the control and navigation of the model window 406. This is shown diagrammatically in FIG. 7 as model navigation area 408. The navigation area 408 preferably includes control buttons that are context-sensitive, that is their functions vary depending upon the event displayed in the video window 402 and the corresponding 2D model window 406. A reset button is provided which will cause the display of a view in the video window that corresponds with the view shown in the model window 406. A "next/previous" button is provided that will cause the viewer 400 to display the next or previous perspective or view in both the model window 406 and the video window 402. As described above, multi-media events are synchronized and organized along a system timeline, and thus one selected event follows or precedes another selected event. A "lost" control button is preferably provided. The lost button causes the viewer 400 to display the location of a selected camera or cameras in the model window 406. Similarly, the model navigation controls allow the user to display the coverage areas provided by a selected sensor or camera. Pan, rotate and zoom controls are provided using the navigation controls. The user can therefore cause the 2D model display (and subsequently cause the video display in the video window 402) to pan, rotate and zoom in and out.

Advantageously, and as described in more detail in the co-pending 3D User Interface application, a "tracking" button is provided which instructs the interactive multi-media system and viewer to "follow" a selected object or player. Once a player or other object is selected by the user, the best view of the selected player or object is continuously provided to the viewer in both the video window 402 and the model window 406. The player's every move is continuously displayed to the user until a view of the player is no longer available or until another user input is provided. In addition, all other information associated with the varying views of the selected object or player are also continuously provided to the display 401. The model navigation area 408 also preferably includes a "chalk board" control button that causes the viewer to display a trajectory track of the selected object(s) from a top view. This function can be very useful in applications such as an American football game whereby plays can be reviewed and studied by tracking a particular player or players. Using this function, not only is the standard "pan" perspective available for review (in the video window 402), but a top view of the field can also be concurrently displayed in the model window 406. In addition, the navigation area 408 preferably also includes a "virtual replay" button that causes the display to provide a best view of a selected replayed event in the model window 406, and thus provide a virtual "instant replay" of a previously viewed event.

In one embodiment using the football example, the model window 406 can be used to display a "play chart". The play chart describes all of the plays that occurred during the football game. A movie reel icon is preferably displayed proximate the plays in the play chart that have video clips associated thereto. When a user clicks on a play in the model window 406 that has a video clip associated thereto, the video clip is cued and subsequently displayed in the video window 402. In one preferred embodiment of the present viewer, a user click on a location in the model window 406 other than a play icon will cause a "drive" chart to be displayed in the model window 406. Those skilled in the user interface art will recognize that the play chart can be replaced by any convenient abstraction of the real-world environment. For example, analogous abstractions can be provided for other sporting events or multi-media programs.

Audio Controls

Standard audio controls are provided in the audio control area 410 of the display 401. The audio controls allow a user to control various audio settings such as volume, muting, mono/stereo, and audio source.

Bookmark Bin

The display 401 includes a user-controlled bookmark bin 412. The bookmark bin 412 provides a convenient means for a user to selectively access favorite video events that are stored in the multi-media database. The multi-media events are indicated to the user in the bookmark bin 412 using video "snapshots" representative of the multi-media events. The user may activate a selected event by pointing a cursor over the event and clicking a user input device such as a mouse. When the user activates a selected event the video sequence associated with the event is cued and subsequently displayed in the video window 402. In one preferred embodiment, to avoid distracting the user, the bookmark bin dissolves into the frame when it is not in use.

Context-Sensitive VCR Controls

As shown in FIG. 7, the display 401 also includes a means for controlling the video window 402 display (and other displays) using context-sensitive VCR controls 414. First, standard "play", "reverse", "forward" and "pause" controls are provided. These controls are similar to analogous controls that are available on standard video cassette recorders, and they function similarly to control the display of video clips in the video window 402. In an alternative embodiment, the VCR control area 414 may also function to allow the user to fast forward (or reverse) between multi-media "events" that are sequenced on a global system timeline within the system database. For example, in the football example described above, the user may move forward to an important play that occurred subsequent to the current play simply by pressing a control button in the VCR control area 414.

Figure 8:
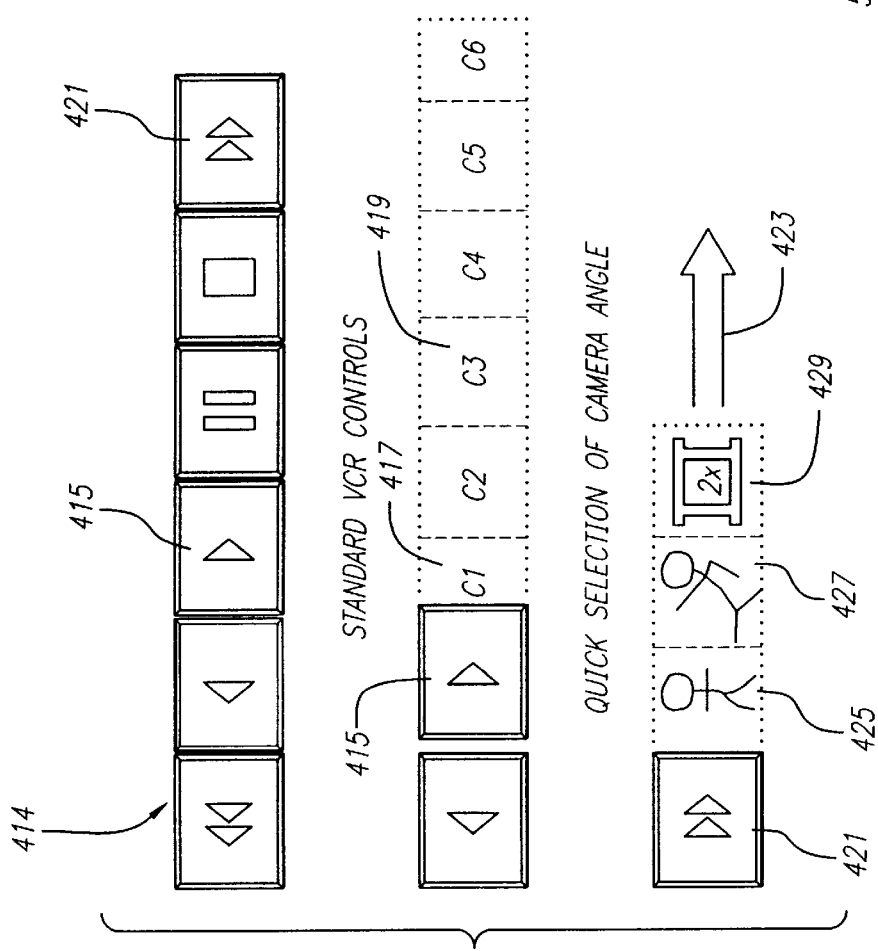
FIG. 8 shows details of the context-based VCR controls shown of FIG. 7.

This context-based VCR control concept is depicted in more detail in FIG. 8. As shown in FIG. 8, the VCR controls 414 include a fast-forward control 421 that can be used to move forward to subsequent video events. Rapidly single clicking the fast-forward control button 421 causes the current video clip to advance a single video frame. Clicking and holding down the button 421 causes the current video sequence to rapidly advance. More interestingly, optional control buttons are displayed when the user depresses the fast forward button 421, and drags the cursor in the direction indicated by direction arrow 423. For example, as shown in FIG. 8, the optional control buttons may comprise a "go to next Object" button 425, a "go to next Event" button 427 and a "fast forward two times" button 429. When the user positions the cursor over the "go to next Object" button 425, the next object in the video event is displayed and followed (if the user so specifies). Similarly, when the user positions the cursor over the "go to next Event" button 427, the next multi-media event on the timeline is cued and displayed by the viewer.

FIG. 8 also shows how a user can use the context-sensitive VCR controls 414 to cause the viewer to display different camera angles. When no video information is currently being displayed in the video window 402, the act of pressing the play button 415 will cause the current multi-media event to be selected. The video clip associated with the current event will be cued and displayed in the video window 402. However, if the play button 415 is depressed when a current video clip is being displayed, the view from the next available camera (C1 417 in FIG. 8) will be displayed to the user. In one embodiment, the act of depressing and holding the play button 415 down causes a list of available camera angles (e.g., "C2", "C3", etc.) to be displayed to the user. In this embodiment of the present viewer, the user can select a camera angle (e.g., C3 419) simply by moving the cursor over the desired camera angle. The viewer reacts by cueing the video clip associated with the selected camera angle and displaying it in the viewing window 402. Other means of accessing different camera angles is described below with reference to the description of the camera angle control 418.

The capability of moving between multi-media events is also described below with reference to the description of the time-line display area 422. Using context-based linking capabilities, the present viewer allows users to move forward (or backward) between multi-media events, objects, players, topics, etc. that are linked together in a database that is created and maintained by the interactive multi-media system described above. The present viewer is thus much more flexible, powerful and intuitive than are the prior art user interfaces because the prior art interfaces constrain the user to moving forward or backward in time. This constraint becomes particularly awkward in applications where time is not a convenient or intuitive linking mechanism.

Finally, the VCR control area 414 also allows users to vary the video frame rates (default frame rates are typically used). The VCR controls 414 also include a control button that will cause the viewer to display an "instant-replay" of the video clip just displayed in the video window 402. In one embodiment, selecting the instant replay-button will cause the viewer to reverse the video clip and re-display the previous five or ten seconds of the video clip.

Time Code Viewing Area

A time code is displayed in the time code viewing area 416. There are several time code modes that can be displayed in the time code viewing area 416. For example, an "absolute" time can be displayed whereby the current or remaining time (in hours, minutes and seconds) is shown in the time code area 416. Alternate time code representations are possible and depend upon the particular multi-media program under view. Examples of time code presentations include: the amount of time remaining in a football or basketball quarter, the amount of time remaining in a soccer half, the amount of time remaining until the next user coffee break, etc.

Camera Angle (Perspective) Control

As shown in FIG. 7, the present inventive viewer preferably generates a display 401 including a user-controlled camera angle control area 418. Although this control area 418 is preferably positioned proximate the video window 402 as shown, it can be positioned elsewhere on the display 401 in alternative embodiments of the viewer 400. The camera angle control area 418 preferably includes a camera icon and a plurality of camera control buttons associated with the real-world cameras. In one embodiment, the name associated with each real-world camera (e.g., "end-zone camera") is displayed in the control area 418. When the viewer is operated in a "manual" mode, the user manually selects different viewing perspectives by simply clicking on a selected camera button in the control area 418. In this mode of operation the selected camera button is highlighted (typically using a color that is different than the unselected cameras).

Alternate Best Views

Importantly, and depending upon the user query, alternate "best views" of a particular object, player or event will be indicated to the user by flashing the camera button capable of providing the next best view. For example, when the user manually operates the viewer, the user manually selects a viewing perspective of a player by pressing a camera button. As the player moves, and as the play develops, the camera selected may no longer provide the best perspective from which to view the player. Therefore, depending upon the user query, the viewer automatically hints to the user that another camera may have a better perspective than the one presently being used. In a "tracking" mode, the system will automatically switch control to the camera having the "best" viewing perspective. Depending upon the application, the viewer uses several criteria in determining the camera angle having the best view of a selected object, player, or event. For example, the viewer can use the field of view provided by a given camera as a best view criterion. In this case, camera selection can be based upon the location of the selected player or object within the frame (preference generally being given to cameras having the object centered within the frame), or the size of the object within the frame. Other "best view" criteria include: the proximity of the camera with respect to the object; the location of the camera; the direction of travel of a selected object; and whether or not the camera is stationary or mobile (moving cameras may track fast moving targets better than a stationary cameras). Finally, the best view possible may depend upon the viewing perspective that a user indicates in the model window 406.

Switching between Camera Angles by Dragging Mouse in a Pre-defined Direction

One of the interesting features provided by the present viewer is its ability to allow a user to intuitively change viewing perspectives using a mouse or other pointing device. As described above, one simple means for changing viewing perspectives is clicking on a camera associated with a desired perspective. Alternatively, the viewing perspective can be changed by positioning a cursor over the viewing window 402 and subsequently dragging the cursor in a pre-determined direction to the edge of the viewing window 402. For example, in one preferred embodiment, a user positions a cursor in the viewing window 402 and drags the cursor in a vertical direction (either up to the top of the window 402 or down to the bottom of the window 402). This action causes the viewer to display the video information generated by a different camera. In the preferred embodiment, dragging the cursor to the top of the viewing window 402 will cause the viewer to display the video output of a previous (logically previous) camera. Similarly, dragging the cursor to the bottom of the viewing window 402 causes the viewer to display the output of a next camera. In one embodiment, the viewing perspectives (the "current", "previous" and "next" camera viewing perspectives) are related to each other in an intuitive manner. For example, the viewing perspective shown when the cursor is dragged in an upward direction is above that currently displayed in the video window 402. Similarly, the viewing perspective shown when the cursor is dragged in a downward direction is below that currently displayed in the video window 402. As described below in more detail, a similar pointing and dragging technique can be used to dynamically change the event displayed by the viewer.

Statistics and Information Viewing Window

The display 401 preferably includes a window for displaying statistics and other data associated with the multi-media event currently being displayed. In the football game example, this data can be statistical data about a player, a team, the yards per carry, interceptions, etc. In the embodiment of the interactive multi-media system 300 described above with reference to FIG. 6, a Stat. Crew computer 318 provides this statistical information. As described above, the multi-media system links and synchronizes the statistical information provided by the Stat. Crew computer 318 with all of the other data types (video, audio, etc.) associated with the multi-media event. Therefore, when an event is selected by the user and displayed in the video display 402, all of the statistical data associated with the selected event is concurrently displayed in the statistics and information viewing window 420. Both internally and externally generated statistical data is displayed in the window 420. Also, in one embodiment of the present viewer, a search text field is provided. The search text field is used by the user to search the database for selected text or statistical data.

Timeline Display and Indexing

As described above, the present interactive multi-media viewing invention provides a number of innovative and useful features and functions that were heretofore unavailable to users of interactive multi-media systems. One important aspect of the inventive viewer 400 is its ability to interact with a multi-media database in an intuitive manner whereby multiple multi-media objects and events are linked together on a global timeline for subsequent accessing by the viewer. As described above with reference to the description of the capture/filter process 304 (FIG. 4), significant multi-media objects and events are preferably stored in a relational object-oriented multi-media database. The multiple data types associated with a selected object/event are synchronized by the system 300 and thereby linked together within the database. For example, a particular video clip, audio feed, associated 3D virtual model, text and other statistical information relating to the video clip are synchronized and linked together within the multi-media database. All of the multi-media data types associated with a particular event are linked together on a global timeline. As an indexing and linking mechanism, the timeline provides a powerful, intuitive and flexible means for interacting with the multi-media system. As shown in FIG. 7, the timeline 422 is displayed in response to a user query in a format that is easily understood by the user.

The timeline 422 comprises a means for graphically displaying the contents of the multi-media database to the user. More specifically, the timeline 422 is a 2D representation of the 3D world environment previously captured, filtered, modeled and stored in the system's multi-media database. The display of the timeline 422 will vary based upon the specific queries entered by the user and based upon the contents of the multi-media events stored in the database. For example, in the football environment, the timeline 422 may graphically represent all of the significant events (highlights) of a football game. Every fumble, interception, touchdown, etc. is graphically represented by the timeline 422. For example, fumbles may be represented using a first color (e.g., red), touchdowns using a second color (e.g., blue), punts using a third color (e.g., yellow), etc. The user can use the timeline 422 to display an entire multi-media program, or alternatively, only a selected portion of the program. Thus, the timeline 422 can function as a global representation of the entire multi-media program, or of a portion thereof. Once the timeline 422 is generated, any selected event can be displayed (e.g., a play can be displayed in the video window 402) by simply positioning a cursor over the representation of the event on the timeline 422 and clicking the mouse. The timeline 422 therefore provides a link to every data type associated with the represented event.

The timeline 422 is used by the viewer to graphically summarize the results of a user query. For example, suppose a user wants to view all of the important plays (e.g., receptions) made by player X. In response to such a query, the timeline would graphically display all of the events that meet this query. The timeline 422 provides temporal information related to the events. Both the timing of an important play (i.e., when in relation to other plays each play occurred during the game) and the duration of the play are graphically depicted by the timeline 422. The timeline preferably includes an event marker length depicting the duration of the event.

Once the timeline 422 is displayed to the user, the user need only select the graphical representation of the event of interest and all of the windows in the display 401 are updated with the appropriate information. For example, assume that the timeline 422 displays all of the fumbles that occurred during a particular football game. By selecting a particular fumble on the timeline 422, the video window 402 displays the previously digitized and stored video clip of the selected fumble. In addition, the play-by-play audio and statistical information associated with the fumble will also be played. The model window 406 will display the 2D model corresponding to the selected fumble. As described above, all of these data types are linked together by the system and displayed in response to a user query. The timeline 422 is a graphical presentation of the query result and is used by the present viewer to link together the multiple data types associated with an event.

Switching between Events or Objects by Dragging Mouse in a Pre-defined Direction Once the user identifies events of interest, he or she can move forward or backward between events by dragging a mouse and thereby moving a cursor within the video window 402 in a pre-defined direction. More specifically, in one embodiment, the user can display the event that occurred prior to the current event by positioning the cursor in the video window 402 and dragging it to the left side of the video window 402. Similarly, the user can display the event that occurred subsequent to the current event by dragging the cursor to the right side of the video window 402. As described above, these events are linked together and graphically displayed to the user on the timeline 422. The arrows (pointing left and right in FIG. 7) on the timeline 422 point to the previous (left arrow) and subsequent (right arrow) events. The user can display these events simply by clicking the arrows. In addition, in one preferred embodiment, a "tool tip" is displayed when the cursor is positioned over the end of the timeline 422. The tool tip shows the total number of events available for viewing.

Query Processing

As shown in FIG. 7, the display 401 also includes a query processing area 424 that allows the user to formulate complex queries. In one preferred embodiment of the present viewer, the query processing area 424 includes a plurality of "pop-up" menus. Each item that can be queried has an associated pop-up menu. For example, in the display 401 of FIG. 7, pop-up menus are available for events, objects (e.g., players), and spatial queries. As described above, the user accesses the query processing area 424 to query the multi-media system (and thereby request display of a particular item of interest). For example, suppose a user wants to display information related to a selected player (object). In this case, the user would click on the "object" pop-up menu and an object "profile" 500 display similar to that shown in FIG. 9 would be presented to the user. The same object pop-up menu is also displayed when the user selects a particular object in the model window 406.

In one preferred embodiment, the pop-up query menus in the query processing areas 424 are linked together and content-sensitive. That is, attributes of the events currently displayed determine the contents of the pop-menus. For example, suppose the user selects a defensive play event (such as a quarterback sack). In this case, the player pop-up menu displayed in the query processing area 424 would be populated only with defensive players. This feature gives the user immediate access to "advanced queries."

Figure 9:
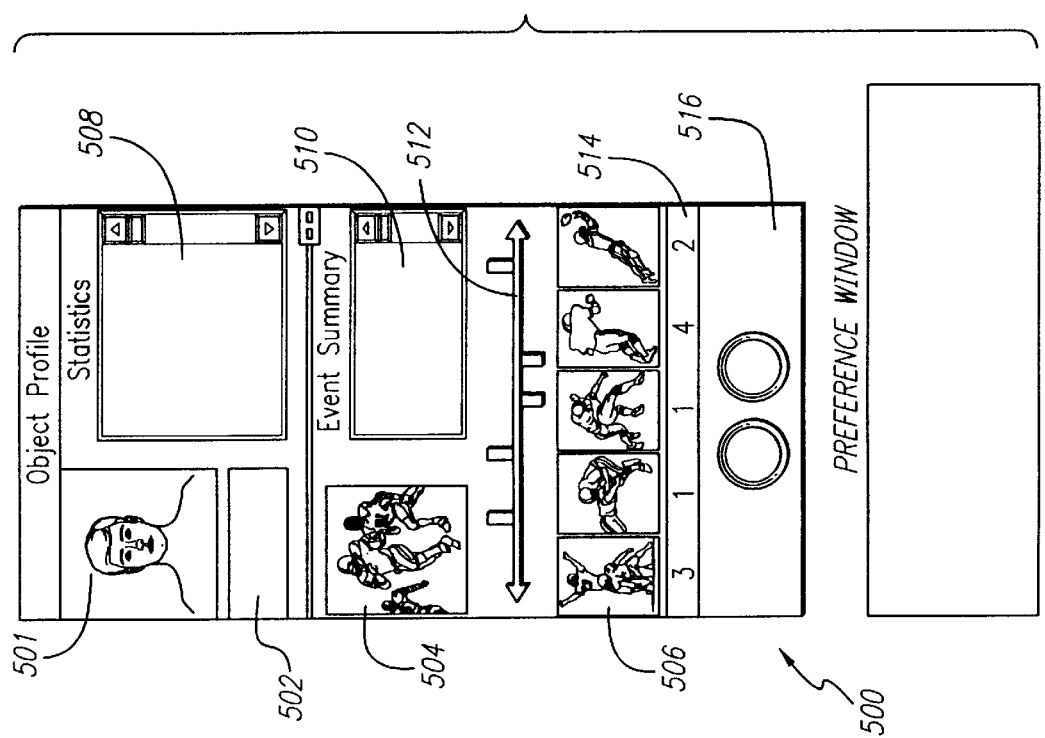
FIG. 9 shows an object profile displaying information about an object selected from the display of FIG. 7.

As shown in FIG. 9, an object "profile" is displayed containing a myriad of information about the selected object. For example, a still video image or snapshot of the object (in this case, a selected football player) 501 is displayed that readily identifies the object to the user. Textual information about the object 502 is also displayed. For example, this information may comprise the object's name. Other textual information such as player statistics is displayed in display area 508. A "preview" video window 504 is also provided. The preview video window displays short video clips or "snippets" associated with the selected object. "Event image" icons 506 are displayed as shown in FIG. 9. The user clicks on a selected icon 506 to display a video snippet associated with the selected event in the preview video window 504. An event summary is also displayed in viewing area 510. The event summary may comprise a textual description of a selected event (e.g., "winning touchdown scored on a 27-yard pass reception with 0:26 remaining in the fourth quarter"). An object timeline 512 is also provided. The object timeline 512 functions similarly to the timeline 422 described above with reference to FIG. 7. However, the object timeline 512 graphically represents events associated with the selected object. The user can access these events by simply clicking on the events on the timeline 512. The number of event occurrences associated with the selected object and the event types (e.g., fumbles) are shown in location 514. Finally, control buttons 516 are provided that facilitate cancellation or authorization of the object pop-up menu functions.

Implementation of the Viewer over the Internet

In one embodiment, the present viewer executes on a computer that is co-located with the interactive multi-media system described above with reference to FIGS. 3–6. However, in the embodiment of the system presently contemplated by the inventors, the viewer is first installed and subsequently executes on the user's computer (typically a personal computer). This embodiment is shown and described above with reference to FIG. 6. Using the present viewer, the user accesses the multi-media system via the well-known world-wide web (or Internet). Alternative communication networks may be used without departing from the scope of the present invention. The following is a description of an exemplary method for using the present invention to access the multi-media system via the Internet. Those skilled in the networking arts will recognize that alternative implementations can be used.

In order to use the viewer, the user first accesses the web server 352 and downloads an installation program that installs the present viewer on the user's computer. The program also registers the user's computer with of the web browsers that are launched by the viewer. The viewer launches an initial web page (transmitted in the well-known HTML format). The viewer preferably comprises a "helper" application. In the embodiment shown in FIG. 6, launching is performed when the user clicks on a link that points to an ASCII file (in one embodiment the file has a ".prv" extension) generated by the highlight reel publisher process 306. The ASCII file contains information related to the various servers accessed during the viewing process. In addition to the server information, the ASCII file preferably contains a "URL" pointer to a binary event database file (in one embodiment the event database file has a ".pdb" extension) maintained by the multi-media system. These files (the ".pdb" and ".prv" files) are typically stored in the same directory on the web server 352. The "URL" of the event database file is relative. The appropriate server (350, 352) prompts the user (or user script program) for password and username information if required.

After the viewer is started on the user's computer, the event database is downloaded to the user's computer from the web server 352. The event database contains the base URL of the video clips provided by the real video server 350. In addition, the event database contains information about the multi-media program. For example, the event database can contain information about the game, players, key plays, and statistical information. Using the viewer and in the manner described above with reference to FIGS. 7–9, the user generates a query. The results of the query are displayed by the viewer on the display 401. As described above, a timeline is created in response to the query that graphically depicts the query results. The user then can select and play events represented on the timeline. Video clips corresponding to the selected camera angle (or other selected event) are fetched from the real video server 350 and transmitted to the viewer for subsequent display. In one embodiment, the precise URL of the selected video clip is determined by the real video server 350 based upon the URL of the video clip, the selected camera angle (or audio feed), and the media type (video/audio). Additional files are fetched from the web server 352 as required.

SUMMARY

In summary, the viewing method and apparatus of the present invention includes a powerful, intuitive, yet highly flexible means for accessing a multi-media system having multiple multi-media data types. The present viewer facilitates multi-perspective interactive viewing of linked multi-media events. The viewer includes an event timeline that provides a graphical representation of the events that satisfy user queries. The user can access an event simply by selecting the representation of the event on the timeline. Because the system links together all of the multi-media data types associated with a selected event, the viewer synchronizes and displays the multiple media when a user selects the event. User perspectives can be based upon varying criteria such as viewing perspectives, objects, and events. Complex queries can be made using the present viewer. For example, particular objects satisfying selected event criteria can be specified by the user. The events satisfying the complex queries are represented and displayed on the timeline. Alternate best views are provided or suggested by the present viewer. The viewer also provides context-sensitive VCR controls that facilitate content-based forwarding/reversing of event displays.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A multi-perspective viewer for interactively viewing a multi-media program derived from a real-world environment, the multi-media program comprising a plurality of multi-media events represented by associated and corresponding multiple multi-media data types stored in a multi-media database, comprising:
   a. user interface means for accepting input from a user and for outputting information from the viewer to the user, wherein the user interface means includes at least one input device and a visual display;
   b. query means for querying the viewer for selected multi-media events, wherein the query means displays an event timeline on the visual display that graphically depicts events that satisfy a selected query;
   c. selecting means, responsive to input from the user interface means, for selecting an event from the event timeline; and
   d. display means, responsive to the selecting means, for displaying the multi-media data types associated with the selected event on the visual display.

2. The multi-perspective viewer of claim 1, wherein the database is created by filtering the multi-media program and capturing only the multi-media events that satisfy event selection criteria.

3. The multi-perspective viewer of claim 2, wherein the database is a spatial/temporal database and wherein the multiple multi-media data types are indexed for subsequent retrieval by query means.

4. The multi-perspective viewer of claim 3, wherein the database is a relational database.

5. The multi-perspective viewer of claim 3, wherein the database is object-oriented.

6. The multi-perspective viewer of claim 2 wherein the event selection criteria is specific to a particular multi-media program.

7. The multi-perspective viewer of claim 2 wherein the event selection criteria is determined by a personality module having pre-defined knowledge of the multi-media program processed by the viewer.

8. The multi-perspective viewer of claim 7, wherein the personality module comprises a utility process capable of identifying significant multi-media events.

9. The multi-perspective viewer of claim 2, wherein the multi-media event selection criteria include inputs from a system user.

10. The multi-perspective viewer of claim 9, wherein the system user inputs include annotation data and control information.

11. The multi-perspective viewer of claim 10, wherein the system user inputs include event starting and event ending control inputs.

12. The multi-perspective viewer of claim 10, wherein the system user inputs include delete, save and override control inputs.

13. The multi-perspective viewer of claim 3, wherein the multi-media database includes fully synchronized audio, video, statistical data, and other data corresponding to the plurality of mutli-media events that satisfy the event selection criteria.

14. The multi-perspective viewer of claim 13, wherein the multi-media database is stored in a hot-swappable audio-video hard disk.

15. The multi-perspective viewer of claim 1, wherein the display means controls the display of the following windows on the visual display:
  a. a video window capable of displaying real-time video clips of the selected event;
  b. a user control window whereby the user can control the display of information on the visual display;
  c. a 2D model window capable of displaying a 3D model of the selected event displayed in the video window;
  d. a model navigation control window that allows the user to control the display of video information in the video window and the display of the 3D model in the model window; and
  e. an event timeline window for displaying the event timeline.

16. The multi-perspective viewer of claim 15, wherein the display means further controls the display of the following windows on the visual display:
  a. an audio control window;
  b. a bookmark bin window;
  c. a context-sensitive VCR control window;
  d. a time code window;
  e. a camera angle control window;
  f. a statistics and textual information viewing window; and
  g. a query processing window.

17. The multi-perspective viewer of claim 15, wherein the video clips displayed in the video window are encoded and compressed prior to being stored in the multi-media database.

18. The multi-perspective viewer of claim 15, wherein the user control window includes the following user control buttons:
  a. a swap control button for which allows the user to interchange the positions of the video window and the model window on the visual display;
  b. a freeze-frame control button which allows the user to freeze the real-time video clip displayed in the video window;
  c. a bookmarks control button for creating user bookmarks;
  d. a preferences pop-up control button;
  e. a zoom control button which allows the user to zoom in and out on an image displayed by the real-time video clip; and
  f. a hyperlink control button.

19. The multi-perspective viewer of claim 15, wherein the model window comprises a 2D representation of a 3D environmental model of the real-world environment.

20. The multi-perspective viewer of claim 19, wherein the 3D environmental model comprises a spatial-temporal database representing a sensed real-world environment, and wherein the spatial coordinates of the 3D model approximately correspond to the spatial coordinates of the sensed real-world environment, and wherein objects in the 2D model window are linked to objects in the 3D model.

21. The multi-perspective viewer of claim 15, wherein the model navigation control window includes context-sensitive control buttons that allow the user to control the display of selected multi-media events on the visual display.

22. The multi-perspective viewer of claim 21, wherein the context-sensitive control buttons include an object tracking button that allows the user to track the progress of a selected object throughout a selected multi-media event.

23. The multi-perspective viewer of claim 15 wherein the event timeline comprises a two-dimensional representation of the synchronized and linked multi-media data types in the multi-media database.

24. The multi-perspective viewer of claim 23, wherein the event timeline is synchronized and linked to the display means and thereby the display of every window on the visual display, and wherein the user selects a desired multi-media event by interacting with the event timeline and thereby causing the display means to correspondingly update each of the windows on the visual display.

25. The multi-perspective viewer of claim 24, wherein the event timeline changes in response to the query means.

26. The multi-perspective viewer of claim 16, wherein the query processing window includes a plurality of pop-up menus for formulating complex event queries.

27. The multi-perspective viewer of claim 16, wherein the audio control window includes controls for controlling volume, muting, mono/stereo, and selection of audio sources.

28. The multi-perspective viewer of claim 26, wherein the plurality of pop-up menus includes an object pop-up menu including an object profile.

29. The multi-perspective viewer of claim 1, wherein the user is a sports coach, and wherein the viewer displays information on the visual display in response to input provided by the coach.

30. The multi-perspective viewer of claim 16, wherein the context-sensitive VCR control window includes a smart fast forward and reverse control button for forwarding and reversing the display of subsequent and previous events, respectively.

31. A method for interactively displaying a multi-media program derived from a real-world environment, the multi-media program comprising a plurality of multi-media events represented by associated and corresponding multiple multi-media data types stored in a multi-media database, the method comprising the steps of:
  a. accepting a query wherein the query specifies selected multi-media events;
  b. displaying an event timeline on a visual display wherein the event timeline graphically depicts events that satisfy the query;
  c. selecting an event from the event timeline; and d. displaying the multi-media data types associated with the selected event on the visual display.

32. The method of claim 31, further comprising the step of outputting audio, textual and other data associated with the multi-media data types displayed in step (d).

33. A system for interactively viewing a multi-media program derived from a real-world environment, comprising:

a. a computer environment including an input device and a visual display;
   b. a plurality of sensors connected to the computer environment and sensing the real-world environment;
   c. capturing means executed by the computer environment for capturing a plurality of multi-media events sensed by the sensors;
   d. filtering means executed by the computer environment for filtering the plurality of multi-media events captured by the capturing means, and for producing a multi-media program, wherein the multi-media program includes only those multi-media events that satisfy event selection criteria;
   e. an environmental model stored in the computer environment, wherein the environmental model represents the multi-media program, and wherein the spatial coordinates of the environmental model approximately correspond to the spatial coordinates of the sensed real-world environment; and
   f. a viewer for interactively accessing selected multi-media events and objects from the multi-media program, wherein the viewer includes an event timeline that graphically displays events stored in the computer environment.

34. The system for interactively viewing a multi-media program as defined in claim 33, wherein the sensors comprise a single video camera and a plurality of sources capable of producing non-video information related to the multi-media program.

* * * * *